United States Patent
Dailing, Jr.

(10) Patent No.: US 11,899,146 B2
(45) Date of Patent: Feb. 13, 2024

(54) PHASE SENSING WITH REDUNDANT SENSOR DIFFERENCE ERROR DETECTION AND SMART CORRECTION

(71) Applicant: Halliburton Energy Services, Inc., Houston, TX (US)

(72) Inventor: John Herbert Dailing, Jr., Montrose, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 180 days.

(21) Appl. No.: 17/414,864

(22) PCT Filed: Jan. 25, 2019

(86) PCT No.: PCT/US2019/015069
§ 371 (c)(1),
(2) Date: Jun. 16, 2021

(87) PCT Pub. No.: WO2020/153967
PCT Pub. Date: Jul. 30, 2020

(65) Prior Publication Data
US 2022/0057536 A1    Feb. 24, 2022

(51) Int. Cl.
*G01H 9/00* (2006.01)
*G01V 1/22* (2006.01)
(Continued)

(52) U.S. Cl.
CPC ............ *G01V 1/226* (2013.01); *E21B 47/135* (2020.05); *G01H 9/004* (2013.01); *G08C 23/06* (2013.01)

(58) Field of Classification Search
None
See application file for complete search history.

(56) References Cited

U.S. PATENT DOCUMENTS

| 8,023,829 B2 | 9/2011 | Nash et al. |
| 2014/0153364 A1 | 6/2014 | Lewis et al. |

(Continued)

FOREIGN PATENT DOCUMENTS

| CA | 2947661 A1 | 11/2015 | |
| WO | WO-2015170114 A1 * | 11/2015 | ......... G01D 5/35361 |
| WO | 2018/156099 A1 | 9/2018 | |

OTHER PUBLICATIONS

International Search Report and Written Opinion Issued in related PCT Application No. PCT/US2019/015069 dated Oct. 16, 2019, 12 pages.

(Continued)

*Primary Examiner* — Curtis A Kuntz
*Assistant Examiner* — Jerold B Murphy
(74) *Attorney, Agent, or Firm* — Kilpatrick Townsend & Stockton LLP

(57) ABSTRACT

A sensing system utilizes multiple wavelengths communicated on a single pulse to a sensor, for example, an optical fiber. Backscattered or reflected light from a number of locations or depths along the sensor are analyzed to correct for $2\pi$ phase jump error. A phase sensing method detects the 2% phase jump error associated with one or more measurements from the sensor. Correcting for the $2\pi$ phase jump error provides increased accuracy of the one or more measurements, for example, improved vertical sensing profiling, production and fracture monitoring, and micro-seismic monitoring.

18 Claims, 12 Drawing Sheets

(51) Int. Cl.
 G01L 1/24 (2006.01)
 E21B 47/135 (2012.01)
 G08C 23/06 (2006.01)

(56) References Cited

U.S. PATENT DOCUMENTS

2015/0116124 A1* 4/2015 Jaaskelainen ......... E21B 47/135
　　　　　　　　　　　　　　　　　　　　340/854.9
2017/0199075 A1* 7/2017 Lewis ................ G01D 5/35329
2018/0238732 A1* 8/2018 Suh .......................... G01V 1/22

OTHER PUBLICATIONS

International Preliminary Report on Patentability issued in related PCT Application No. PCT/US2019/015069 dated Aug. 5, 2021, 9 pages.

* cited by examiner

PHASE SENSING WITH REDUNDANT SENSOR DIFFERENCE ERROR DETECTION AND SMART CORRECTION

CROSS-REFERENCE TO RELATED APPLICATION

The present application is a U.S. National Stage Application of International Application No. PCT/US2019/015069 filed Jan. 25, 2019, which is incorporated herein by reference in its entirety for all purposes.

TECHNICAL FIELD OF THE INVENTION

The present disclosure relates generally to improve overall phase measurement signal integrity, quality, sensitivity and dynamic range in a sensing system, for example, a distributed acoustic sensing system. More particularly, this disclosure relates to improved phase sensing for a subterranean operation or environment, for example, vertical seismic profiling, microseismic monitoring, fracture monitoring, production flow rate monitoring and any other hydrocarbon monitoring, recovery and production operation or environment, such as oil and gas wells or other tubular systems.

BACKGROUND

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a borehole or a wellbore at a desired well site, treating the borehole or wellbore to optimize production of hydrocarbons, and performing the necessary steps to produce and process the hydrocarbons from the subterranean formation including using distributed acoustic sensing. The terms borehole or wellbore may be used interchangeably throughout the present disclosure.

Certain optical phase sensing systems (such as a distributed acoustic sensing (DAS) system) include measurement and logging devices or various tools which use interferometric detection approaches. For example, interferometric detection approaches may utilize optical fiber or cable as a sensing element and downhole seismic data and information is measured by an attached information handling system or an optoelectronic device. This data and information may, for instance, relate to the physical condition of a sensing system, the characteristics of a subterranean formation surrounding the borehole or sensing system, and proximate or surrounding temperature, acoustics, vibrations, or movement.

In real-world large-angle phase measurement systems, certain inaccuracies may occur in measurements due, for example, to signal and system noise. Such noise is a problem for phase sensing systems as each measurement from a phase sensing system involves an assumption about which direction around the phase unit circle the measurement represents. Certain inaccuracies caused by phase estimation processes in low signal to noise situations lead to bombastic transient demodulation errors which leads to reduced overall phase measurement integrity. Thus, traditional phase sensing systems may not accurately account for phase jumps which leads to reduced overall phase measurement signal integrity, signal quality, signal sensitivity and dynamic range.

FIGURES

Some specific exemplary embodiments of the disclosure may be understood by referring, in part, to the following description and the accompanying drawings.

Figure 1:
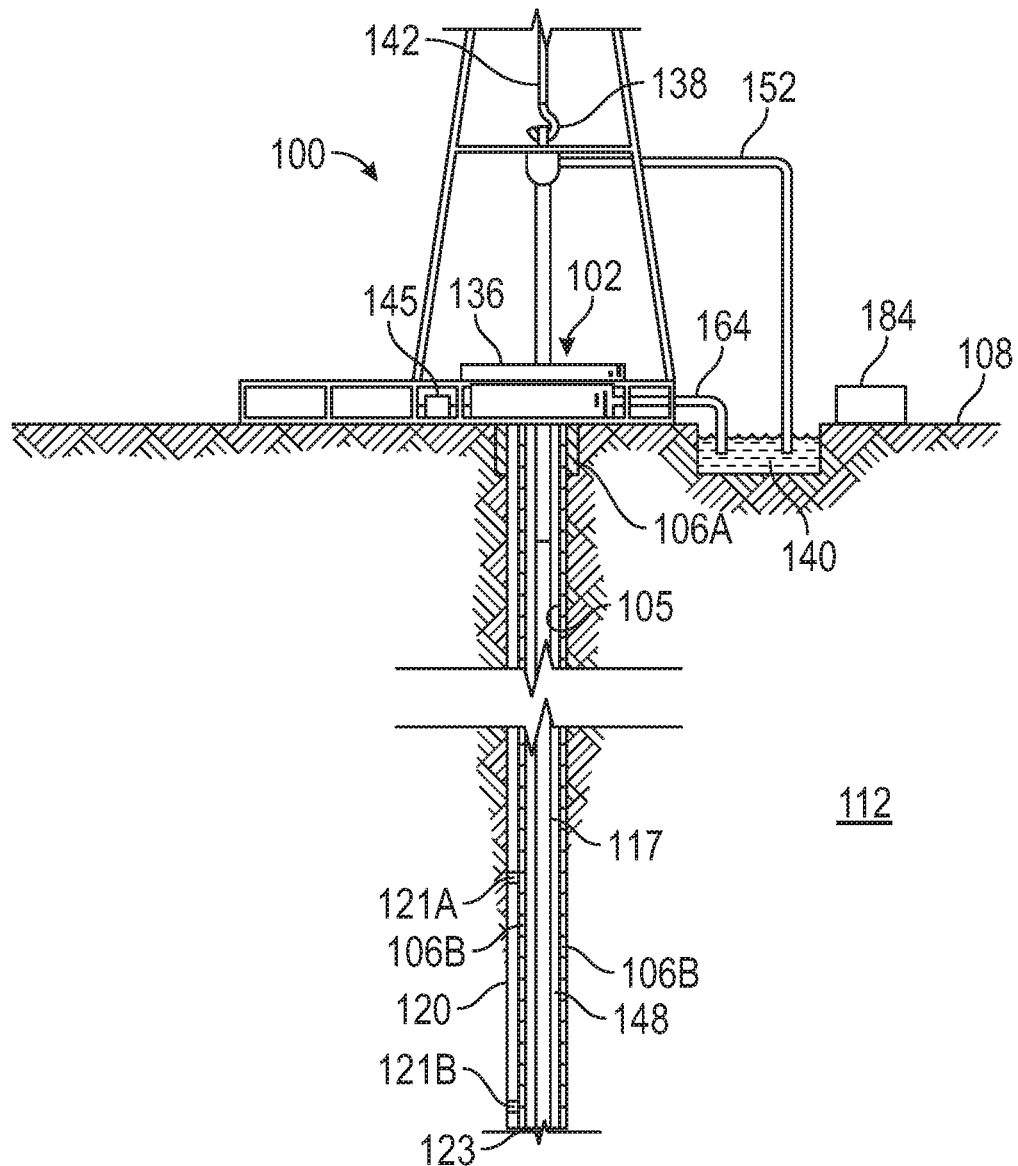
FIG. 1 is a diagram showing an illustrative logging environment in which an optical fiber is deployed along a production casing to facilitate distribute acoustic sensing of a downhole environment, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to one or more discrete phase sensing systems, for example, one or more distributed acoustic sensing (DAS) systems. A DAS system may be utilized for vertical seismic profiling, production and fracture monitoring, and micro-seismic monitoring.

In one or more embodiments, if a first device couples to a second device, that connection may be through a direct connection or through an indirect mechanical or electrical connection via other devices and connections. In one or more embodiments, devices that are communicatively coupled may be a connection that may be a wired or wireless connection such as, for example, Ethernet or LAN. Thus, if a first device communicatively couples to a second device, that connection may be through a direct connection, or through an indirect communication connection via other devices and connections.

When sensing the phase of a signal using a phase sensing or demodulating system in the real world, signal noise, system noise or both may be introduced. Such noise may reduce signal amplitude, signal strength or both, cause reoccurring signal amplitude fading, any one or more other system inaccuracies, any other noise issue and any combination thereof. This noise results in a low signal-to-noise ratio (SNR) for the sensing system. DAS systems which implement interferometric optical phase measurement approaches or techniques are a prime example of this noise. First, the backscatter light levels which return at, about or approximately 10,000 times smaller than the light launched into a sensor, for example, an optical fiber. Second, the DAS interferometric response is significantly hampered by two types of "fading" or reduction of interferometric visibility which further diminishes the signal to be phase demodulated. The first type of fading is unique to DAS, where the backscatter return signal is made up of a composite of hundreds to thousands of interfering scatters. This is known as Rayleigh fading where the interferometric portion of the signal can range from zero to ideal maximum. The second type of fading is common to fiber interferometry in general when using single or multimode fibers and is known as polarization fading.

Figure 8:
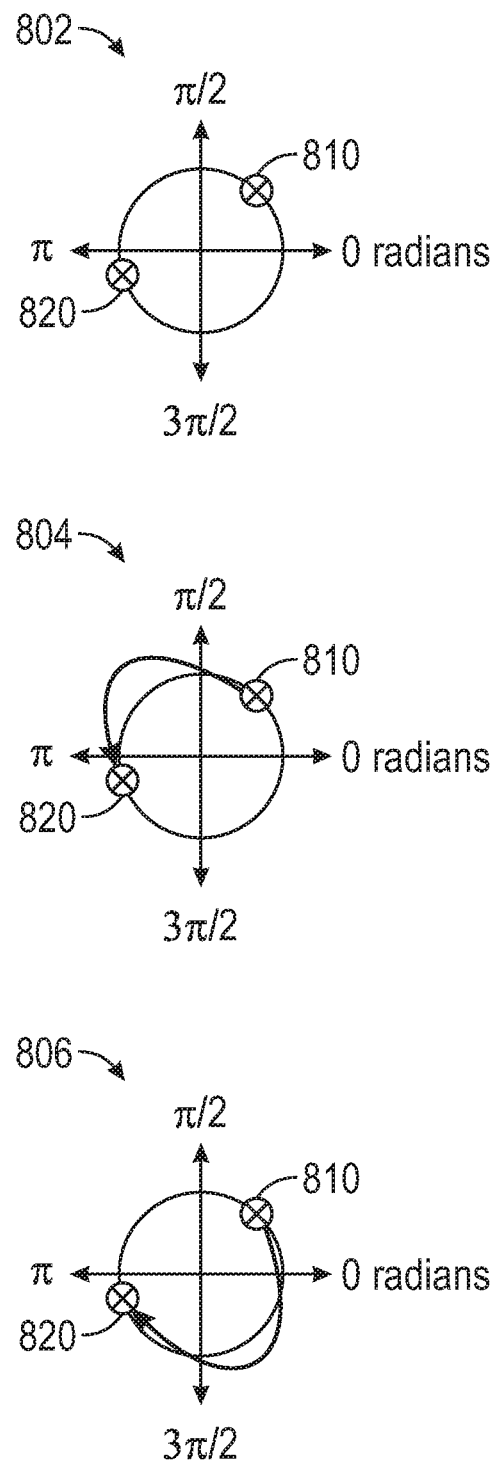
FIG. 8 illustrates an example phase-shift, according to one or more aspects of the present disclosure.

Conventional (optical) phase sensing DAS systems are considered fully faded (very low SNR) when the phase demodulation process fails by causing a substantial number of transient errors per unit time. One of ordinary skill in the art recognizes the transient errors per unit time as occurring two to six percent of the time when using a DAS system where only a single wavelength is used. These described inherent and problematic phase demodulation errors due to low SNR result from the large angle phase demodulation process. Generally, DAS systems are sampled in time. A first phase is determined by processing quadrature terms or pairs I and Q by inverse trigonometric means where the first phase is estimated and bounded to a value between 0 and $2\pi$, and thus on the unit circle. Subsequent phase values for subsequent samples are measured in the same manner. Stitching algorithms are used to estimate a continuous in-time large angle demodulated signal. The simplest approach is to determine the phase trajectory between consecutive temporal samples to be the shortest path on the unit circle. Thus, the largest possible transition is less than it radians, for example, as illustrated in FIG. 8 at unit circle 804 where a previous phase advances from previous phase 810 to new phase 820 as the shortest path.

This type of demodulation approach becomes error prone when SNR is low. Stitching errors may result that cause incorrect trajectories and cause errors of a full phase cycle ($2\pi$ radians or 360°). This inherent error is applicable to any phase sensing system as each measurement involves an assumption about which direction around the phase unit circle that the measurement received from the phase sensing system represents. For example, FIG. 8 illustrates an example phase-shift, according to one or more aspects of the present disclosure. A previous phase 810 and a new phase 820 are illustrated at unit circle 802. Traditionally, the shorter distance direction is assumed correct and is selected for use in any analysis or processing of the measurements received from the phase sensing system, for example, as shown at unit circle 804. However, each time the longer distance selection should have been selected, for example, as shown at unit circle 806, a $2\pi$ phase jump or difference occurs between the actual signal and the measured and processed signal. Thus, this $2\pi$ phase jump artifact is inherent in traditional phase sensing systems and methods.

It would be beneficial to implement error correction processes to detect and correct for these $2\pi$ phase jumps and especially so as a real time process. For a single wavelength DAS system effective correction is difficult to implement as error detection becomes ambiguous when real signals are superimposed with the $2\pi$ jumps. The $2\pi$ phase jump combined with the distribution or range of time makes detection and determination or correction the signals received from a phase sensing system difficult, For example, effectively discerning real moving phase signals from the $2\pi$ phase jump artifacts or errors is difficult. However, a DAS system according to one or more aspects of the present disclosure that implements multiple simultaneous wavelength interrogation schemes results in a substantive increase of information which enables precise error detection. This increase in accuracy is due to each wavelength contributing to independent simultaneous measures of the same sensor, where processes may be implemented to cross compare this "redundant" data to greatly improve the certainty of error detection.

In one or more embodiments of the present disclosure, the phase (or phase offset) for each of a first wavelength and a second wavelength carried on an optical signal will differ but the change in phase or delta phase (dPhase) should not change. The delta phase or transition is achieved by subtracting the previous phase measured from the new phase measured and in this process of discretely simplifying phase and determining the delta phase, the inherent problem of not corrected and unavoidably introduced phase jumps is introduced.

As discussed herein, one or more embodiments improve overall phase measurement signal integrity, signal quality, sensitivity and dynamic range by utilizing redundant sensing, phase difference error detect and smart correction. The difference in phase sensed from two or more independent sensed signals sensing the same physical phenomena is used to detect and correct a specific type of phase sensing error, the phase jump error. For example, a sensor or optical fiber is interrogated using different wavelengths simultaneously so as to sense the same physical phenomenon or unprocessed data, the running difference between the wavelengths measured and processed phase signals may be used to detect the unwanted $2\pi$ phase jump error in phase sensing systems with greater effectiveness than traditional non-redundant approaches. When the real-world phase signal from the sensor is changing or constant no persistent phase difference (other than noise and fading, both being uncorrelated) should exist between the redundant two or more sensed phase signals. At all times any persistent accumulated difference in dPhase between two sensors or any two sensors should be far less than the 2π radians caused by a phase jump inherent in all systems and methods. However, in one or more embodiments of the present disclosure, these phase jumps are detected more reliably and better than traditional methods as a running phase difference is examined to reliably detect the phase jumps and discern them from the real signal. Additionally, the detection method discussed herein does not impact signal bandwidth and accurately locates, identifies and corrects the phase samples containing the 2π jump to produce a running phase with the 2π phase jumps reliable detected and accurately corrected with insignificant or unnoticeable negative impact to the real dynamic signals and zero impact to real signal offset. For fiberoptic, interferometric phase sensing systems, redundant sensors may be achieved by launching a plurality of wavelengths of light into the same fiber optic cable to obtain a plurality of redundant measurements or measurement streams for processing that allow for greater accuracy in the detection of a 2π phase jump which improves interferometric phase sensing across a variety of applications, for example, vertical seismic profiling, production operation and fracture or stimulation operation monitoring, and micro-seismic monitoring.

In one or more embodiments of the present disclosure, an environment may utilize an information handling system to control, manage or otherwise operate one or more operations, devices, components, networks, any other type of system or any combination thereof. For purposes of this disclosure, an information handling system may include any instrumentality or aggregate of instrumentalities that are configured to or are operable to compute, classify, process, transmit, receive, retrieve, originate, switch, store, display, manifest, detect, record, reproduce, handle, or utilize any form of information, intelligence, or data for any purpose, for example, for a maritime vessel or operation. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data, instructions or both for a period of time. Computer-readable media may include, for example, without limitation, storage media such as a sequential access storage device (for example, a tape drive), direct access storage device (for example, a hard disk drive or floppy disk drive), compact disk (CD), CD read-only memory (ROM) or CD-ROM, DVD, RAM, ROM, electrically erasable programmable read-only memory (EEPROM), and/or flash memory; biological memory, molecular or deoxyribonucleic acid (DNA) memory as well as communications media such wires, optical fibers, microwaves, radio waves, and other electromagnetic and/or optical carriers; and/or any combination of the foregoing.

FIG. 1 is a diagram showing a logging environment 100 in which an optical fiber 120 is deployed along a production casing 106B to facilitate distribute acoustic sensing of a downhole environment according to one or more aspects of the present disclosure. A well 102 includes a wellbore 105 encased by a surface casing 106A and a production casing 106B. The wellbore 105 extends from a surface 108 of the well 102 to or through a subterranean formation 112. In one or more embodiments, the optical fiber 120 has an end-to-end length of at least 100 meters. In one or more embodiments, the optical fiber 120 has an end-to-end length of at least 500 meters. In one or more embodiments, the optical fiber 120 may have an end-to-end length of 1 kilometer, 5 kilometers or any other length as required for a given operation. The surface casing 106A and the production casing 106B insulate downhole tools and strings deployed in the wellbore 105 as well as hydrocarbon resources flowing through the wellbore 105 from the surrounding formation 112, prevent cave-ins, and prevent contamination of the surrounding formation 112.

A hook 138, cable 142, traveling block (not shown), and hoist (not shown) are provided to lower a tubing 117 down the wellbore 105, or to lift the tubing 117 up from the wellbore 105. The tubing 117 may be any type of tubing required for a particular environment such as production tubing. At wellhead 136, an inlet conduit 152 is coupled to a fluid source (not shown) to provide one or more fluids downhole. In one or more embodiments, the tubing 117 has an internal passage that provides a fluid flow path from the surface 108 downhole. In one or more embodiments, the one or more fluids travel down the tubing 117 and exit the tubing 117 or one or more downhole fluids flow through the tubing 117 to the surface 108. The one or more fluids flow back toward the surface 108 through a wellbore annulus 148, and exit the wellbore annulus 148 via an outlet conduit 164 where the one or more fluids are captured in a container 140.

The optical fiber 120 has one end 121A (first end) that is operable to receive one or more optical signals from an optoelectronic device 145 and another end 121B (second end) coupled to a termination component 123 such as a termination housing or another component or material that forms a low reflectance termination of the optical fiber 120. As defined herein, the optoelectronic device 145 may include any device operable to transmit optical signals having a signal wavelength or having multiple wavelengths within a range of a wavelengths. In one or more embodiments, the optoelectronic device 145 is a distributed acoustic sensing (DAS) interrogator. In one or more embodiments, the optoelectronic device 145 is electronically controlled and utilizes a feedback loop to generate one or more optical signals within a specific frequency range.

Figure 2:
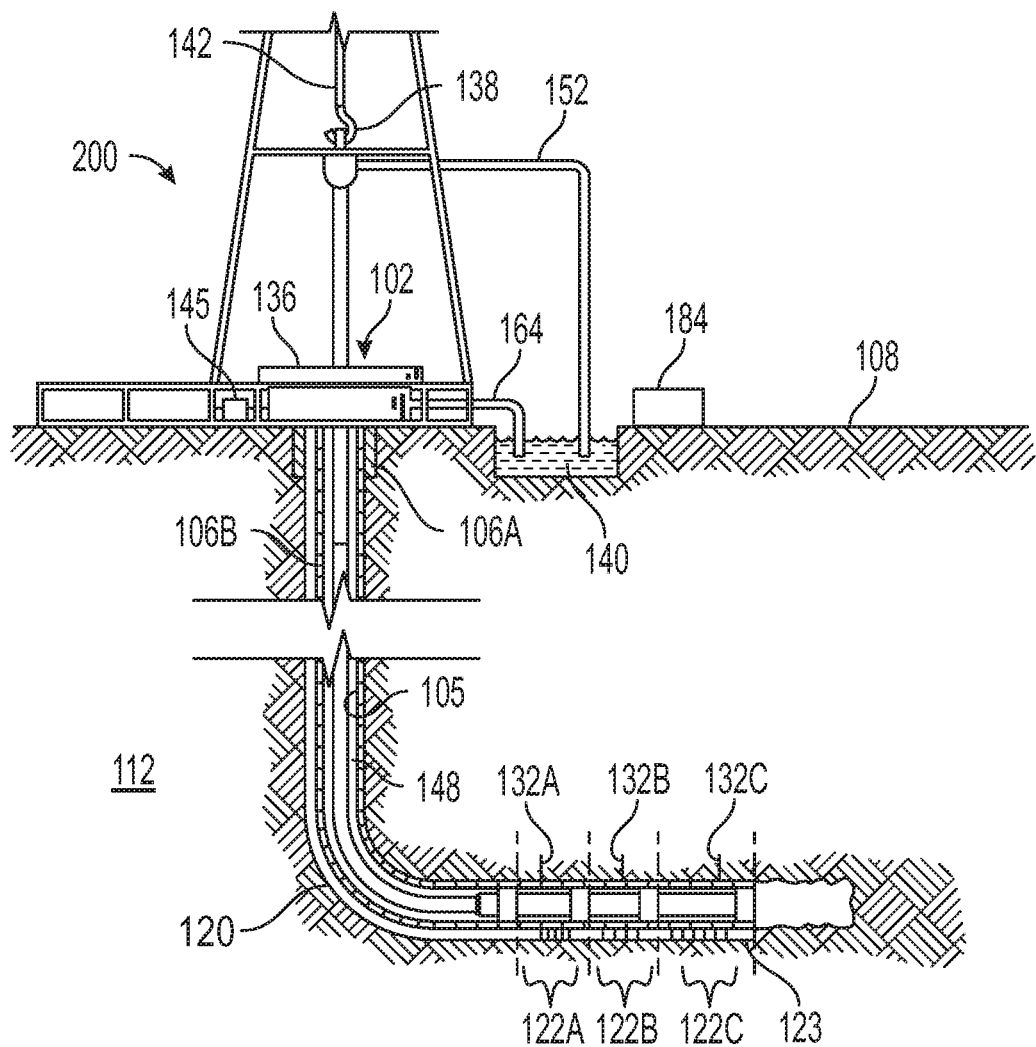
FIG. 2 is a diagram showing an illustrative logging environment in which an optical fiber is deployed along a production casing to facilitate distributed acoustic sensing of a downhole environment, according to one or more aspects of the present disclosure.

FIG. 2 shows a logging environment 200 in which an optical fiber 120 is deployed along the production casing 106B to facilitate DAS of the downhole environment 150. As shown in FIG. 2, a first section of sensing fiber 122A is imprinted along a section of the optical fiber 120 that is deployed proximate a first region of interest (a first production zone) 132A, a second section of sensing fiber 122B along a section of the optical fiber 120 that is deployed proximate a second region of interest (a second production zone) 132B, and a third section of sensing fiber 122C along a section of the optical fiber 120 that is deployed proximate a third region of interest (a third production) 132C. The first, second, and third sections of sensing fiber 122A, 122B and 122C, may be traditional single mode or multi-mode optical fiber or optical fibers that are intentionally manufactured to provide for enhanced backscatter or enhanced guided backscatter which serve to enhance DAS sensed signal SNR.

In one or more embodiments, illustrated in FIGS. 1 and 2, the optical fiber 120 is deployed along and outside the production casing 106B. In one or more embodiments, the optical fiber 120 is deployed inside the production casing 106B. In one or more embodiments, the optical fiber 120 is coupled to the tubing 117 and is deployed together with the tubing 117.

Figure 3:
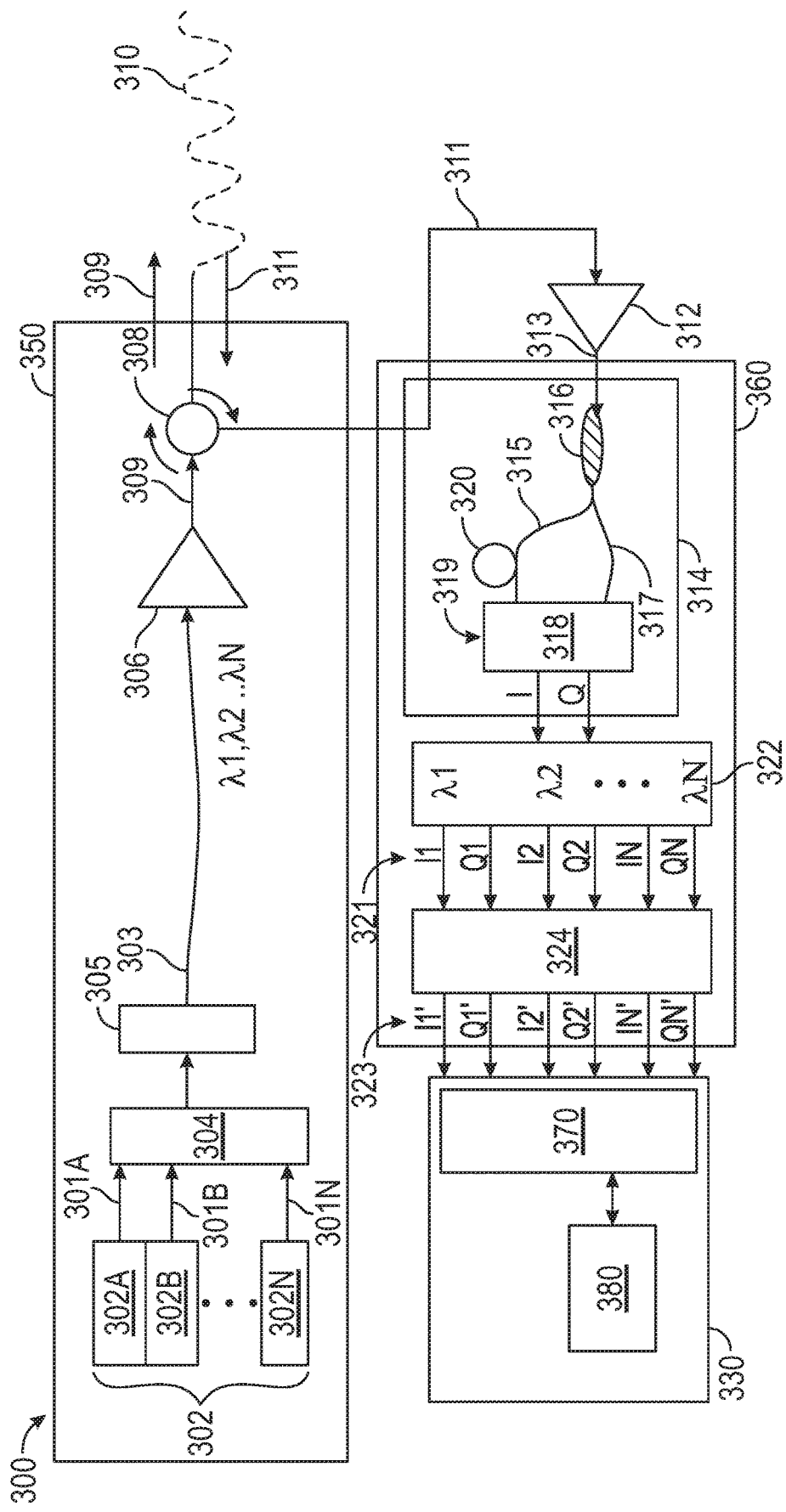
FIG. 3 is a diagram illustrating a sensing system, according to one or more aspects of the present disclosure.

FIG. 3 is a diagram illustrating an example sensing system 300, according to one or more aspects of the present disclosure. In one or more embodiments, optoelectronic device 145 may comprise sensing system 300. In one or more embodiments, sensing system 300 comprises a transmitting system 350, a fiber 310, a first optical amplifier 312, a sensing or receiving system 360 and a control system 330. In one or more embodiments, any one or more of transmitting system 350, sensing or receiving system 360 and optical amplifier 312 may be the same as or similar to interrogator 502 of FIG. 5. In one or more embodiments, interrogator 502 may comprise a Coherent Rayleigh Interrogator (CRI).

In one or more embodiments, a transmitting system 350 may comprise a plurality of light sources 302, for example, light sources 302A, 302B through 302N, a wavelength division multiplexer (WDM) 304, an optical pulser 305, a first optical amplifier 306 and a circulator 308. Each light source 302 transmits or communicates a source signal 301 at a distinct or unique wavelength. For example, the source wavelength generated by light sources 302A, 302B and 302N corresponding to source signals 301A, 301B and 301N, respectively, may be represented as $\lambda_1$, $\lambda_2$ and $\lambda_N$, respectively, where "N" represents any number. For example, any source wavelength $\lambda_1$, $\lambda_2$ and $\lambda_N$ may be separated by more than 0.1 nanometers to assure only uncorrelated noise between each sensed signal associated with each source wavelength. Typical interrogation pulses may range between 10 nanoseconds and 100 nanoseconds (ns). In one or more embodiments, any one or more light sources 302 may be a high coherence light source, for example, a laser. Each light source 302 may be communicatively coupled to a first WDM 304. The first WDM 304 may couple to an optical pulser 305 that receives an output from the first WDM 304 and transmits or pulses an optical signal or pulse 303 based on the output from the first WMD 305. Optical signal or pulse 303 comprises a pulse that represents or carries each source wavelength $\lambda_1$, $\lambda_2$ and $\lambda_N$. Optical signal or pulse 303 is received by a first optical amplifier 306 that boosts the intensity of the optical signal or pulse 303 to a first amplified pulse 309. For example, the first optical amplifier 306 may be an erbium-doped fiber amplifier (EDFA). The first amplified optical pulse 309 may be transmitted to a circulator 308. The circulator 308 transmits the amplified optical pulse 309 to a sensor 310, for example, an optical fiber.

Backscattered or reflected waveform or sensed signal 311 from the sensor 310 is received at the circulator 308 and transmitted or output to a second optical amplifier 312. The second optical amplifier 312 may be an EDFA amplifier. The second optical amplifier 312 may amplify the backscattered or reflected waveform or sensed signal 311 to generate a measurement or second amplified signal 313. The measurement signal 313 may represent, be associated with or otherwise correspond to one or more attributes, conditions or characteristics sensed by the sensor 310, for example, a temperature, a pressure, a vibration, an acoustic, any other sensing measurement and combination thereof. The measurement signal 313 is received by a sensing or receiving system 360. Sensing or receiver system 360 may comprise an interferometer 314, wavelength division demultiplexer (WDDM) 322 and optical receiver 324. Interferometer 314 may comprise a coupler 316 that receives the measurement signal 313 from the second optical amplifier 312. The coupler 316 may be communicatively coupled to a quadrature recombiner 318 and a delay coil 320. A first portion signal 315 of the measurement signal 313 is transmitted to the delay coil 320 from the coupler 316. The delay coil 320 sets the gauge length of the first portion signal 315. An output from the delay coil 320 provides the phase delay input to quadrature recombiner 318. A second portion signal 317 of the measurement signal 313 is transmitted as a signal input to the quadrature recombiner 318.

Quadrature recombiner 318 outputs a measurement signal as a quadrature term or pair 319 generally referred to as an in-phase component "I" and a quadrature component "Q". The in-phase component "I" and the quadrature component "Q" from the quadrature recombiner 318 are inputs to the WDDM 322. The WDDM 322 generates a plurality of outputs 321 that correspond to each source wavelength, for example, source wavelengths $\lambda_1$, $\lambda_2$ and $\lambda_N$. In one or more embodiments, the WDDM 322 generates a plurality of outputs 321, for example, an in-phase component "I1" and a quadrature component "Q1" for source wavelength $\lambda_1$, an in-phase component "I2" and a quadrature component "Q2" for source wavelength $\lambda_2$ and an in-phase component "$I_N$" and a quadrature component "$Q_N$" for source wavelength $\lambda_N$. The plurality of outputs 321 are received by or transmitted to the optical receiver 324. Optical receiver 324 converts the plurality of redundant outputs 321 to a corresponding plurality of electrical outputs 323, for example, outputs I1', Q1', I2', Q2', $I_N$' and $Q_N$' which are associated with outputs I1, Q1, I2, Q2, $I_N$ and $Q_N$, respectively. For example, the optical receiver 324 may convert the plurality of redundant outputs 321 to a current, a voltage or any other electrical attribute that varies over time.

In one or more embodiments, the data acquisition unit or processor 330 may comprise an analog to digital converter (ADC) 370 that communicates, for example, phase data or information associated with the electrical outputs 323 to an information handling system 380. In one or more embodiments, information handling system 380 comprises one or more information handling systems 700 of FIG. 7. Information handling system 380 may analyze the phase data or information to determine, for example, a vertical seismic profile for a given formation, for example, formation 112 of FIG. 1 or FIG. 2, production and fracture monitoring, and micro-seismic monitoring. In one or more embodiments, the information handling system 380 may utilize the phase data or information to control fracture spreads in the formation 112. For example, based, at least in part on the phase data or information one or more of a pressure, a rate of pumping, a chemical circulated downhole (such as a diverter fluid or friction reducer) may be altered or adjusted.

Figure 4:
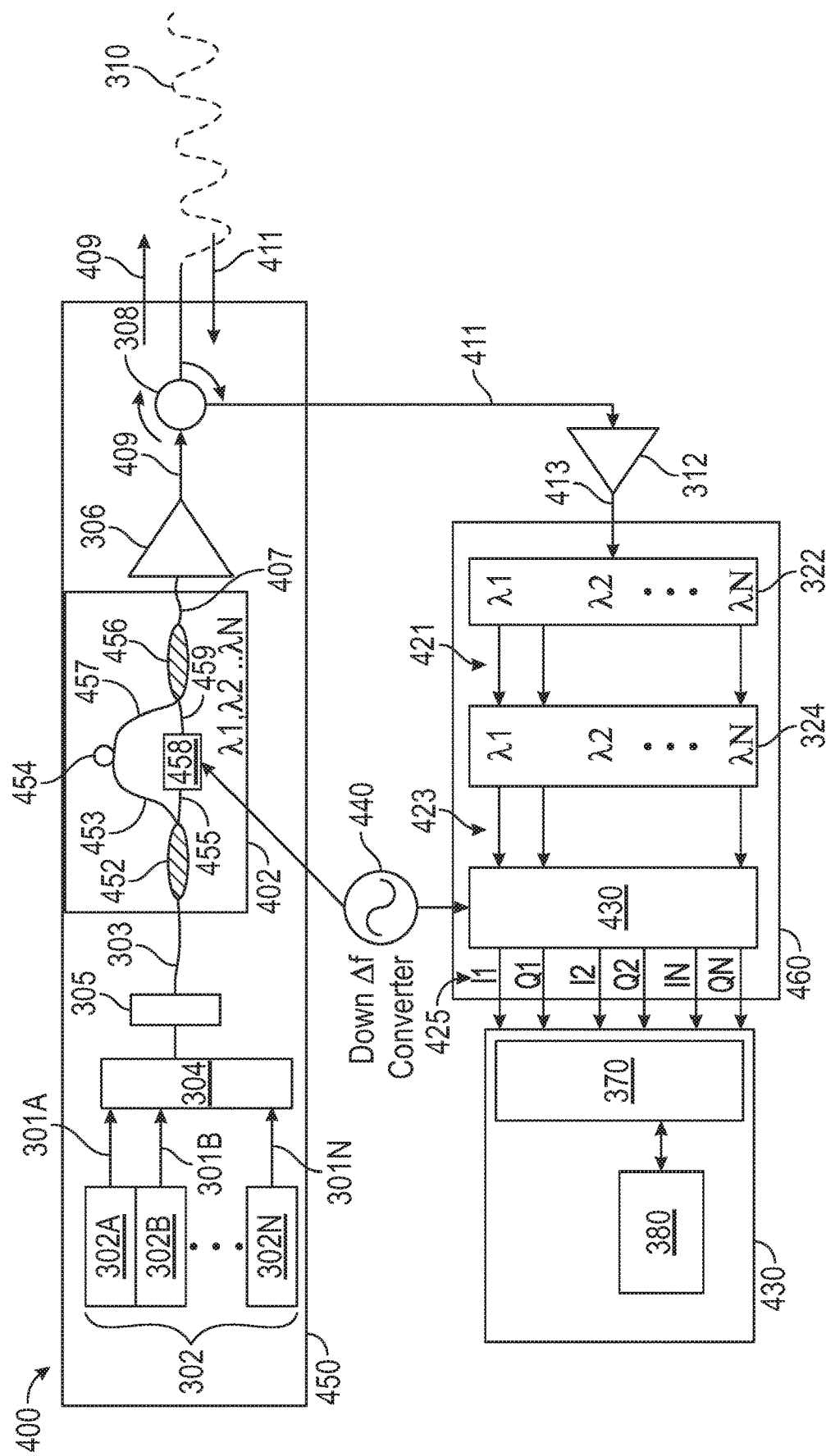
FIG. 4 is a diagram illustrating a sensing system, according to one or more aspects of the present disclosure.

FIG. 4 is a diagram illustrating an example sensing system 400, according to one or more aspects of the present disclosure. In one or more embodiments, an optoelectronic device 145 may comprise a sensing system 400. In one or more embodiments, sensing system 400 comprises a transmitting system 450, a fiber 310, a first optical amplifier 312, sensing system 460, a down converter 440 and a control system 430. In one or more embodiments, fiber 310 may be the same as or similar to optical fiber 120 of FIG. 1 or 2.

In one or more embodiments, a transmitting system 450 may comprise a plurality of redundant light sources 302 as discussed above with respect to FIG. 3, a first WDM 304, an optical pulser 305, a delay interferometer 402, a first optical amplifier 306 and a circulator 308. Each light source 302 transmits or communicates light at a distinct or unique wavelength. For example, the source wavelength generated by light sources 302A, 302B and 302N may be represented as $\lambda_1$, $\lambda_2$ and $\lambda_N$, respectively, where "N" represents any number. Each light source 302 may be communicatively coupled to a WDM 304. WDM 304 may be coupled to optical pulser 305 that receives an output from the WDM 304 and transmits or pulses an optical signal or pulse 303 based on the output from the WDM 304. Optical signal or pulse 303 comprises a pulse that represents or carries each source wavelength $\lambda_1$, $\lambda_2$ and $\lambda_N$.

Optical signal or pulse 303 is received by the delay interferometer 402. Delay interferometer 402 may comprise a first coupler 452, a delay coil 454, a second coupler 456 and a modulator 458. First coupler 452 receives the optical signal or pulse 303 and splits the optical signal or pulse 303 into a first portion signal 453 of optical signal pulse 303 and a second portion signal 455 of optical signal or pulse 303. First portion signal 453 is received by a delay coil 454 that sets the gauge length for the first portion signal 453 to produce a delay signal 457. The second portion signal 455 is received by a modulator 458. The modulator 458 shifts the frequency of the second portion signal 455 by, for example, by $\Delta f$. The modulator 458 outputs a frequency shifted optical signal 459. For example, a frequency shift of $\Delta f$ may be created by an acoustic-optic or electro-optic modulator and may range between 50 to 200 megahertz as a fixed frequency. The frequency shifted optical signal 459 and the delay signal 457 are received by the coupler 456 that outputs a dual-pulse with a time difference caused by delay coil 454. The dual-pulse signal 407 is received by the first optical amplifier 306 that boosts the intensity of the dual-pulse signal 407 to a first amplified optical pulse 409. The first amplified optical pulse 409 may be transmitted to a circulator 308. The circulator 308 transmits the amplified optical pulse 309 to a sensor 310, for example, an optical fiber.

The backscattered or reflected waveform or sensed signal 411 represents a heterodyned modulated response from the sensor 310 is received at the circulator 308 and transmitted or output to a second optical amplifier 312. The second optical amplifier 312 may amplify the backscattered or reflected waveform or sensed signal 411 to generate a measurement or second amplified signal 413. The measurement signal 413 is received by a receiver system 460. Receiver system 460 may comprise a WDDM 322, an optical receiver 324 and an N-channel quadrature down converter 430 that down-converts the N heterodyne return signals by I1f and outputs I-Q pairs, for example, electrical outputs 425 (I1-Q1, I2-Q2 and IN-QN).

In one or more embodiments, a downhole telemetry element may communicate the backscattered or reflected waveform or sensed signal, such as 311 or 411, to a sensing or receiving system 360 or 460 located downhole or at a surface. In one or more embodiments, a surface telemetry element may comprise a sensing or receiving system 360 or 460 or may receive one or more outputs from the sensing or receiving system 360 or 460. In one or more embodiments, the optoelectronic device 145 may comprise a data acquisition unit or processor 330. In one or more embodiments, the data acquisition unit or processor 330 may be disposed downhole, for example, as part of a downhole telemetry element.

By utilizing a sensing system, for example, as discussed with respect to FIGS. 3 and 4, the running difference between the redundant measurements or phase associated with each of the plurality of wavelengths may be used to detect or determine the unwanted $2\pi$ phase jump errors commonly present in sensing systems with greater effectiveness than conventional phase sensing systems or single wave interrogation systems. Implementing a system sensing 145, 300, 400 or any combination thereof requires working with temporally limited blocks of data or measurements. For example, acquisition and processing of one or more blocks of data or measurements of real sensed data results in a latency such as at least a one second latency. Discrete phase sensed, real-time processing allows for only limited discrete blocks of temporal phase measurement that can be processed at once with each block boundary having to be properly addressed at every process step. The improved phase sensing method utilized in conjunction with sensing systems discussed herein takes into account real-time processing, the limits and practicalities that real-time processing imposes and the primary importance on processing efficiency and reduced overhead.

In one or more embodiments, the processing efficiency is increased and the overhead reduced by dynamically categorizing the quality of each phase of the received measurement signal, for example, measurement signal 313 of FIG. 3 and measurement signal 413 of FIG. 4, based on magnitude or magnitude divided by phase noise (SNR). This allows automatically and dynamically restricting the processing overhead of components of the method to only phase signals of low enough magnitude or SNR to warrant the phase jump detection and the associated overhead. This type of signal quality categorization improves the overall sensing of the one or more attributes, for example, the one or more attributes of a formation such as formation 112.

Figure 5:
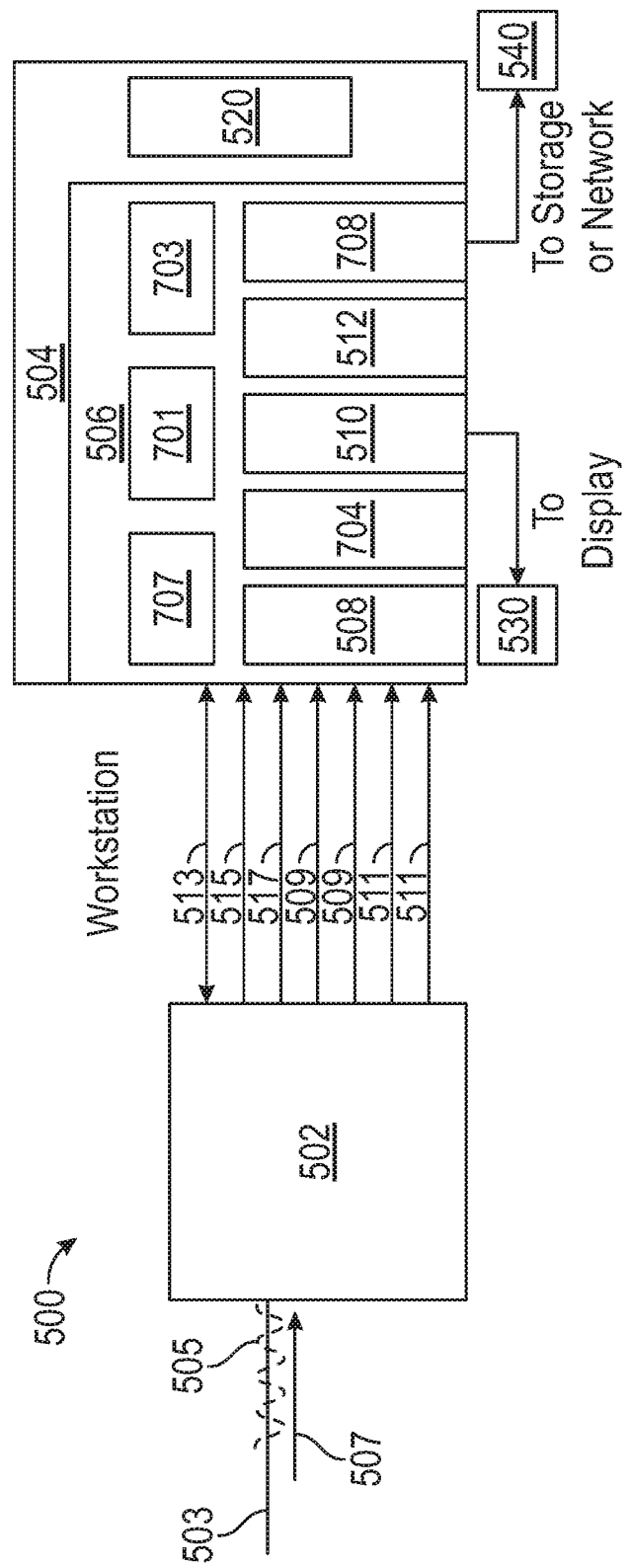
FIG. 5 is a diagram illustrating a sensing system, according to one or more aspects of the present disclosure.

FIG. 5 illustrates an example sensing system 500 for a DAS application, according to one or more aspects of the present disclosure. The sensing system 500 includes an interrogator 502 coupled to a workstation 504. As signals randomly "fade", having two redundant signals versus a single signal adds robustness and improves the signal quality of the sensing system 500. The SNR may also be increased, for example, by 3 decibels, when two signals are averaged. Phase jumps are detected using sensing system 500 without reducing signal bandwidth. Temporal and spatial averaging of quadrature terms or pairs I and Q reduces higher frequency noise as well as processing, display and storage throughput requirements. For temporal averaging, the sensing signal bandwidth is also reduced below the Nyquist sample frequency. For spatial averaging, the sample resolution is reduced from, for example, 100 mega-samples per second sampling that results in about one meter sample resolution.

For a DAS application, a fiber 503, or fiber sensor, is interrogated. For example, two separate sensed signals, one for each wavelength launched into fiber 503 return scattered and are measured. The interrogator 502 splits the combined wavelength signal from the fiber 503 into separate wavelength components 511 (I1 and Q1) and 509 (I2 and Q2). The type of measured return scatter is called Coherent Rayleigh Scatter. In one or more embodiments, the interrogator 502 may comprise a Coherent Rayleigh Interrogator (CRI).

In one or more embodiments, the interrogator 502 drives a single pulse 505 of two wavelengths repeatedly into a fiber 503 and senses the light returned, for example, sensed signal 507, via the fiber 503. The returned or sensed light 507 is converted to electronic signal outputs or quadrature terms or pair I and Q. Two of the signals represent the quadrature terms or pair, the in-phase component and the quadrature component I1 and Q1, respectively (collectively referred to as first quadrature terms or pair 509) for the sensed light 507 associated with a first wavelength and an other two signals represent the quadrature terms or pair, the in-phase component the quadrature component I2 and Q2, respectively (collectively referred to as second quadrature terms or pair 511) for the sensed light 507 associated with a second wavelength. The first and second quadrature terms or pairs 509 and 511 are used to determine the phase and the magnitude of the sensed light 507.

For each redundantly measured quadrature pair I and Q, if temporal or spatial averaging is desired, a temporal averaging, a spatial averaging or both are initially performed. For each redundantly measured quadrature pair I and Q, a predetermined or continuously determined offset subtraction is performed. An I versus Q scaling correction is then performed, if needed, for any redundant quadrature pairs. For each redundantly measured quadrature pair I and Q, the phase and magnitude are determined, with the phase information converted to a temporal dPhase by subtracting the old phase from the new phase and limiting any positive or negative dPhase transition to plus or minus it radians by selecting the dPhase trajectory that satisfies this limit, otherwise referred to as selecting the shortest path around the phase unit circle. By monitoring the accumulated different between the redundantly measured dPhase data, a phase jump is reliable and accurately detected, and this is accomplished without filtering or otherwise restricting real signal bandwidth. After detecting a phase jump, the temporal samples containing the phase jump are precisely located. Next, which redundantly measured signal's phase that in fact jumped is determined and then that redundantly measured signal is corrected by replacing the associated dPhase data in a manner that exactly corrects for the $2\pi$ radians of phase jump, leaving zero offset or impact from the correction, is performed.

Once the redundantly measured phase data has been corrected for any possible phase jumps, the associated dPhase data is collectively averaged. When averaged, the average magnitude over a temporal block of data of each redundant quadrature pair is used to weight the average to obtain a weighted average single dPhase result. If the average magnitude of any redundant quadrature pair is below a threshold (indicating poor quality or "faded"), that quadrature pair may not be used for jump detection and correction or for determining the dPhase weighted average. A single dPhase is determined conditionally and dynamically using any one or more redundant quadrature pairs. In one or more embodiments, if only one redundant quadrature pair is above a faded threshold based on average magnitude of the redundant quadrature pairs over a temporal block, only a single redundant quadrature pair is used to determine the single dPhase. If no redundant quadrature pairs are above the faded threshold, a dPhase output of zero is set for the temporal dPhase samples within the associated temporal block Once a block of dPhase data is collected, the dPhase data is combined with the previous block of dPhase data. Beginning with the previous block of dPhase data, at the locations of the temporal samples where phase jumps were corrected, the dPhase samples are re-examined using a larger temporal range of samples than with the initial correction. This re-examination is also to cross data block boundaries, which was a limit of the initial correction, thus if no re-examination was performed in lieu of a more accurate initial correction, the one or more initial corrections would still be limited in the associated accuracy for phase jumps that occurred near data block boundaries. Also, any processing related to phase jump correction occurs at a low duty cycle compared to phase jump detection, which is executed on every temporal sample for data blocks where the processing is dynamically or statically enabled. Thus, reducing low duty cycle correction processing into one step presents mostly on disadvantages. Additional advantages of the of determining the correction re-examination result after the weighted average is that signal is reduced while the possible $2\pi$ phase jump being detected is not reduced since if an initial correction selected the wrong redundant measurement to correct, a full $2\pi$ phase jump is still present in the accumulated weighted averaged dPhase, and thus easily detectable and discernable from the real signal and easy to fully and exactly correct for the $2\pi$ of phase jump leaving zero impact on real offset levels. This is in contrast to other approaches that attempt to detect phase jumps post weighted average, like the present re-examination, but these other approaches average down the yet to be detected and corrected $2\pi$ of phase jump during any averaging step similar to the weighted average used here, thus leaving $\pi$ or less of phase jump buried in and poorly discernable from the real signal that can change by plus or minus $\pi$ with every temporal sample which does not provide detection of jumps with high accuracy and any corrected jumps impact offset or direct current (DC) levels.

Real world phase signals will have a distribution of noise, similar to a Gaussian distribution or other distribution models, and the most effective way to combat the limits in accuracy this presents is to perform multiple subsequent determinations of dPhase, each examining increasingly larger temporal ranges and having other advantages that improves the accuracy of the dPhase determinations. At each dPhase determination, the statically best assumptions are made and even though each non-final determination of dPhase may be incorrect, the determination of dPhase is corrected through subsequent processing. The first dPhase determination is the shortest path dPhase based on one temporal dPhase sample, and the first dPhase accuracy is purely a proportional function of the amount of real dPhase plus total noise. The second dPhase determination is based on a correction examining the same sixteen temporal samples that were determined to contain a phase jump as part of the dPhase different jump detection. The third dPhase determination re-examines the temporal samples that were corrected along with the temporally neighboring samples. This third and final dPhase determination is able to cross data block boundaries and catch the 2% or less of the incorrect dPhase corrections that would result from an optimally executed second dPhase determination. This three step approach along with phase difference detection enables processing to proceed while in the end detecting and correcting $2\pi$ phase jumps with much greater accuracy than other approaches, for example, approaches that use fewer steps or do not use phase difference.

The interrogator 502 may be communicatively coupled to an information handling system 504. Information handling system 504 may be similar to or the same as information handling system 700 of FIG. 7. The information handling system 504 may comprise a motherboard 506 and a power supply 520. The motherboard 506 may comprise a hard drive 707, a CPU 701, a memory 703, a digitizer 508, a GPU 704, a solid state device (SSD) 512 and an I/O interface 708. The information handling system 504 may be communicatively coupled to the interrogator 502 via a control line 513, a clock line 515 and a trigger line 517. The control line 513 may comprise a universal serial bus (USB) for sending signals to and receiving signals from the interrogator 502. The clock line 515 and trigger line 517 may cycle in the data from the interrogator 502 to the information handling system 504 for processing. For example, the clock line 515 and trigger line 517 may couple to a digitizer 508 of the information handling system 504. Clock line 515 and trigger line 517 may cause the digitizer 508 to read quadrature terms or pair 509 and second quadrature terms or pair 511 and communicate the information or data to the CPU 701 for processing or to hard drive 707, memory 703 or both for storage.

In one or more embodiments, one or more results or images associated with the sensed light 507 may be displayed on display 530 communicatively coupled to the GPU 704. In one or more embodiments, the one or more results or images associated with the sensed light 507, information or data received via the digitizer 508 may be communicated or transmitted via the I/O interface 708 to a storage or network location 540, for example, such as a database. In one or more embodiments, storage or network location 540 may be local to or remote from the sensing system 500.

Figure 6A:
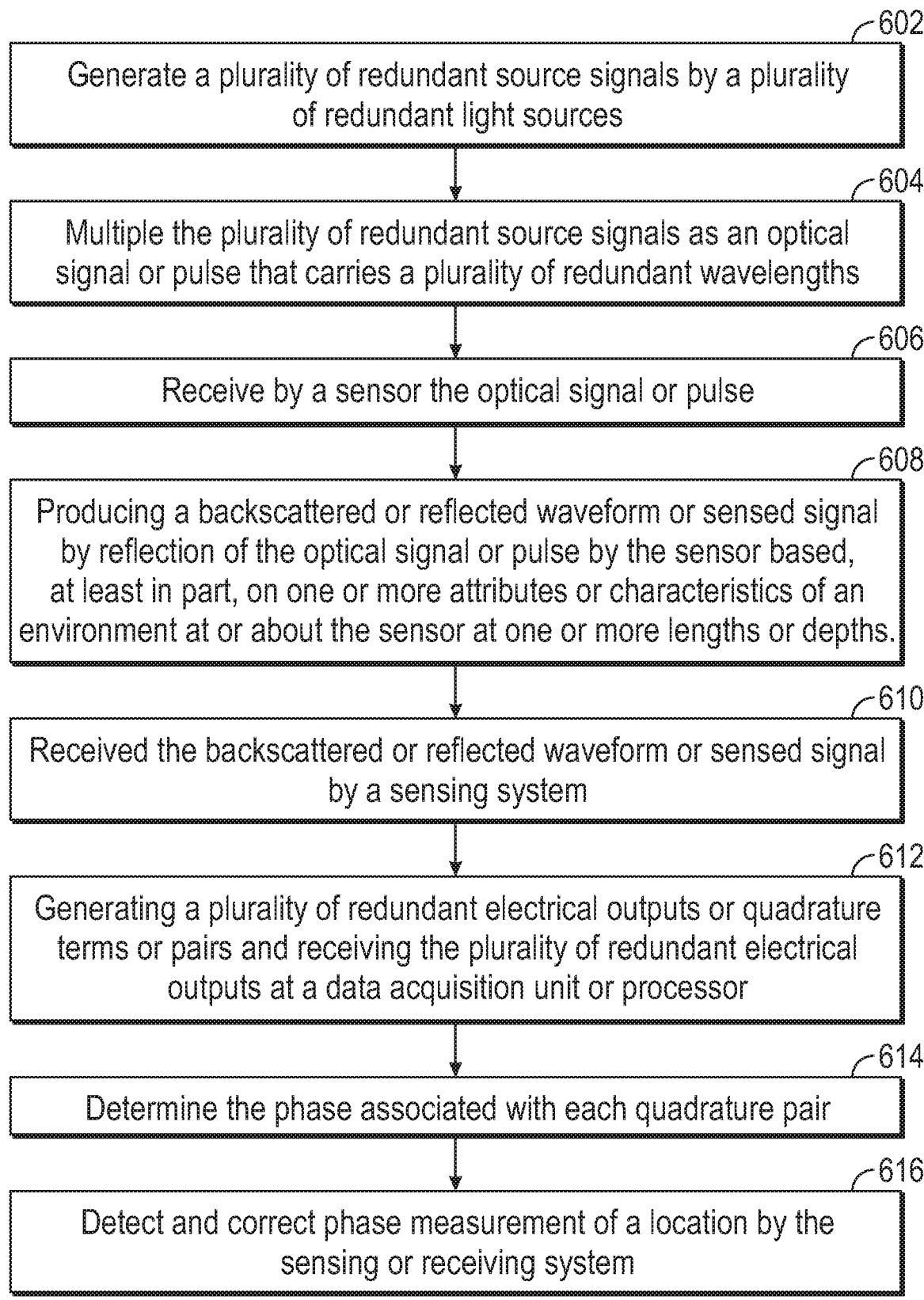
FIG. 6A is a flowchart illustrating an example sensing method, according to one or more aspects of the present disclosure.

FIG. 6A illustrates a method for detecting and correcting phase sensing error or $2n$ phase jump errors, according to one or more aspects of the present disclosure.

At step 602, a plurality of redundant source signals, for example, a plurality of redundant source signals 301, are generated by a plurality of redundant light sources, for example, a plurality of redundant light sources 302. Each of the plurality of source signals 301 comprises one or more distinct or unique wavelengths, for example, one or more source wavelengths of $\lambda_2$ and $\lambda_N$.

At step 604, the plurality of redundant source signals 301 are multiplexed as an optical signal or pulse, for example, optical signal or pulse 303 that carries a plurality of redundant wavelengths. Each of the plurality of redundant source signals 301 are uncorrelated and are used to interrogate the same sensor, for example, sensor 310. In one or more embodiments, the plurality of redundant source signals 301 may be altered or adjusted as discussed above with respect to FIGS. 3 and 4.

At step 606, a sensor, for example, optical fiber 120 of FIG. 1, sensor 310 of FIG. 3 or fiber 502 of FIG. 5, receives the optical signal or pulse 303. In one or more embodiments, the sensor is an optical fiber.

At step 608, backscattered or reflected waveform or sensed signal, for example backscattered or reflected waveform or sensed signal 311, 411 or 507 is produced by reflection of the optical signal or pulse 303 by the sensor 310 based, at least in part, on one or more attributes or characteristics of an environment at or about the sensor 310 at one or more lengths or depths. For example, the sensor 310 may be disposed within a formation, for example, a sensor 310 may be disposed within a wellbore or borehole 105 in a formation 112.

At step 610, the backscattered or reflected waveform or sensed signal 311 or 411 is received by a sensing system, for example, sensing or receiving system 360 or 460 as discussed above with respect to FIGS. 3 and 4, respectively. In one or more embodiments, the backscattered or reflected waveform or sensed signal, such as 311, 411 or 507, is sampled at one or more locations, for example, one or more lengths or depths of the sensor 310. Each wavelength provides redundant temporal samples per each location. In one or more embodiments, the one or more spatial locations may be at one or more predetermined lengths or depths such as at 1 meter, 2 meters, and any other length or depth.

At step 612, the sensing or receiving system 360 or 460 generates or otherwise produces a plurality of redundant electrical outputs or quadrature terms or pairs, for example electrical outputs 323, 425 or 511, suitable for processing by a data acquisition unit or processor 330, 430 or 504 for processing the redundant temporal samples of the reflected waveform or sensed signal associated with a spatial location or a plurality of spatial locations for each redundant electrical output or quadrature term or pair. The plurality of electrical outputs 323, 425 or 511 are received by a data acquisition unit or processor, for example, data acquisition unit or processor 330, 430 or 504 as discussed above with respect to FIGS. 3, 4, and 5, respectively.

For example, a first quadrature pair associated with a first wavelength carried by the optical signal generates redundant temporal samples of the reflected waveform or sensed signal associated with a spatial location. A second quadrature pair associated with a second wavelength carried by the optical signal generates redundant temporal samples of the reflected waveform or sensed signal associated with the same spatial location. In one or more embodiments, any number of quadrature pairs may be utilized.

At step 614, the phase associated with each quadrature pair is determined. For example, a first phase is determined for each of the plurality of redundant temporal samples of the reflected waveform or sensed signal for the location based, at least in part, on the first quadrature pair associated with a first temporal sample and a second temporal sample of the plurality of redundant temporal samples. A second phase is determined for each of the plurality of redundant temporal samples of the reflected waveform or sensed signal for the location based, at least in part, on the second quadrature pair associated with the first temporal sample and the second temporal sample of the plurality of temporal samples.

At step 616, the sensing or receiving system 360, 460 or 504 detects or determines a corrected phase measurement for the location, for example, a $2\pi$ phase jump error associated with the one or more electrical outputs 323, 425 or 511. For example, the sensing or receiving system 360, 460 or 504 stores one or more instructions in a non-transitory computer readable media that when executed by processor detect or determine a $2\pi$ phase jump in real-time. For example, as the shortest path around the unit circle may be used as the initial determination of the dPhase which may be referred to as a shortest path dPhase. When looking at two adjacent, discrete samples in time, the shortest path dPhase is the statistically correct assumption. However, in real world environments, noise sources or other phenomena may reduce sensed signal amplitude which contributes to a SNR low enough to make the shortest path dPhase assumption a wrong or incorrect assumption. At every wrong assumption, the processed phase differs from the actual phase by a full unit circle or by $2\pi$ radians presenting an artificial $2\pi$ radian jump in the discretely sensed phase data.

Figure 6B:
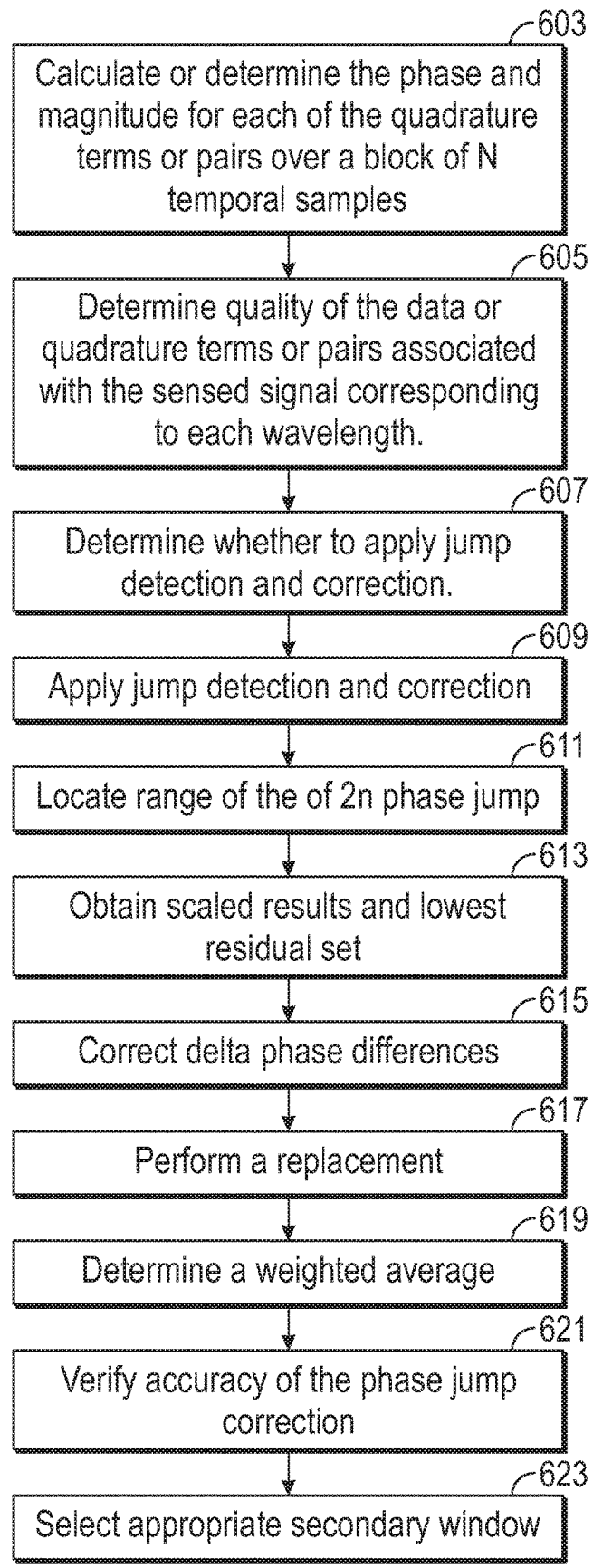
FIG. 6B is a flowchart illustrating an example sensing method, according to one or more aspects of the present disclosure.

To adequately detect and correct unwanted, artificial phase jumps, step 616 may comprise one or more steps as discussed with respect to FIG. 6B which illustrates a method for an optical real-time phase sensing method, according to one or more aspects of the present disclosure.

As illustrated with respect to FIG. 6B, a first challenge in real-time processing for a phase sensing system is how to properly detect the unwanted, artificial $2\pi$ phase jump. During phase sensing what is actually fundamentally, accurately sensed by a sensor is a dPhase. A $2\pi$ phase difference (plus or minus noise) between the multiple wavelengths represented by the backscattered or reflected waveform or sensed signal, such as 311 or 411, persistent over time represents a $2\pi$ phase jump error. At step 603, the phase ($\phi$) and magnitude (M) for each of the quadrature terms or pairs (for example, first and second quadrature terms or pairs 509 and 511 of FIG. 5, $I_N'$ and $Q_N'$ of FIG. 3 or $I_N$ and $Q_N$ of FIG. 4), over a block of N temporal samples (by L locations or spatial samples) is calculated or determined. For example, to calculate the phase, an inverse tangent function may be used, for example, using Equation 1.

$$\phi = a\tan 2(y, x) \quad \text{(Equation 1),}$$

where y equals the quadrature component (Q or Q') and x equals the in-phase component (I or I') for a given wavelength. The block of N temporal samples may comprise averaged temporal samples or un-averaged temporal samples. The number of temporal samples in a block N may be set based on temporal interests. For example, previous DAS data may suggest that fading lasts from about 0.1 seconds to at or about 2 seconds. To better discern faded data or bad data from acceptable data, the block time should be fractions of the minimum faded time, about 0.1 seconds. Dividing the minimum faded time into four equal blocks provides for 25 millisecond blocks. At a 10 kiloHertz (kHz) interrogation rate, for example, 256 samples occur in 25.6 milliseconds (ms). A block size of at least a factor of four smaller than the narrowest faded window is recommended. A higher ratio than four of minimum faded time divided by block time will improve the discerning ability but as block sample size gets smaller, any calculations performed over the block have more variance. Thus, generally a block time of a fourth to a tenth of the minimum faded time provides sufficient data.

Phase is calculated for each wavelength, for example, $\lambda_1$ and $\lambda_2$ at each temporal sample i of the N temporal samples, for example, $\phi_{1i}$ associated with a first wavelength and $\phi_{2i}$ associated with a second wavelength. A dPhase ($\phi'$) is determined for each of the plurality of temporal samples of the reflected waveform or sensed signal for the location based, at least in part, the quadrature pairs associated with each wavelength. For example, the phase ($\phi$) is determined using Equation 1 and the dPhase ($\phi'$) for each wavelength is determined based, at least in part, on a difference between the current phase and a previous phase, for example, using Equation 2.

$$\phi'_\lambda = \phi_{\lambda,i} - \phi_{\lambda,i-1} \quad \text{(Equation 2).}$$

The dPhase difference for the reflected waveform or sensed signal at a location for each of the plurality of temporal samples (N) is determined, for example, using Equation 3.

$$\Delta\phi' = \phi'_{1i} - \phi'_{2i} \quad \text{(Equation 3).}$$

The magnitude, M, of the quadrature terms pairs for each wavelength may be determined using, for example, Equation 4.

$$M_{\lambda,i} = \sqrt{I_{\lambda,i}^2 + Q_{\lambda,i}^2} \quad \text{(Equation 4).}$$

An average magnitude, $\overline{M}$, of each magnitude M over the block of N temporal samples is obtained using, for example, Equation 5.

$$\overline{M}_\lambda = \frac{\sum_{i=1}^{N} M_{\lambda,i}}{N}. \quad \text{(Equation 5)}$$

The phase and average magnitude is calculated or determined for each sensed signal for each wavelength. In one or more embodiments, the average magnitude for each sensed signal for each wavelength may be used to determine a weight for the final dPhase average result. In one or more embodiments, a corrected phase measurement for each location may be determined based, at least in part, on the dPhase associated with the reflected waveform or sensed signal at a location, the phase associated with each wavelength, and the average magnitude associated with each wavelength as discussed below.

In one or more embodiments, the number of temporal samples, N, in a processing block may be set based, at least in part, on one or more temporal interests. For example, DAS data may suggest that fading lasts from about 0.1 seconds to a couple of seconds. To discern faded or bad data from acceptable or good data, one-fourth of the minimum faded time, 01 seconds is 25 ms. At a 10 kHz interrogation rate, for example, 256 samples occur in 25.6 ms. The block size may be at least a factor of four smaller than the temporally narrowest faded window. A higher ratio than four of minimum faded time divided by block time may improve the discerning ability but as block sample size gets smaller, any calculations performed over a block has more variable. Generally, a block time of one quarter to one-tenth the minimum faded time is selected.

At step 605, a determination is made as to the quality of the data or quadrature terms or pairs associated with the sensed signal corresponding to each wavelength. For example, the average magnitude, $\overline{M}$, associated with a time block is used to assess quality. One or more quality regions may be defined with average magnitude thresholds, fixed or programmable, in between each quality region. For example, in one or more embodiments, four quality regions may be defined with a first quality region and a second quality region having the first threshold distinguishing the first and second quality regions, the second quality region and a third quality region having a second threshold distinguishing the second and third quality regions, and the third quality region and a fourth quality region having a third threshold distinguishing the third and fourth quality regions. For example, the first region may extend at or below the first threshold, the second region may extend from at or above the first threshold to at or below the second threshold, the third region may extend from at or above the second threshold to at or below the third threshold, and the fourth region may extend from at or above the third threshold. Quadrature terms or pairs that fall within the first, second, third and fourth regions may be assessed as faded, partially faded/very noisy, noisy, and good, respectively. In one or more embodiments, the first threshold may be set to one to two times the root mean square (RMS) noise of the system, for example, the optical fiber 120, the second threshold may be set to four to ten times above the first threshold (or where phase jump are not occurring, and the third threshold may be set to two to four times above the second threshold. Generally, setting the first threshold to one to two times above RMS noise of the system and scaling the second threshold and third threshold above the first threshold as discussed above provides sufficient results.

In one or more embodiments, a sensing system may utilize two wavelengths, $\lambda_1$ and $\lambda_2$. In a first scenario, if the sensed signals or quadrature terms or pairs associated with both of the wavelengths are within the first quality region, a dPhase of zero over the time block at a specific location is used. In a second scenario, if only a first sensed signal associated with a first wavelength is within the first quality region, then only the second sensed signal associated with a second wavelength not within the first quality region is used and thus no wavelength difference detection or correction or weighted average is utilized. In a third scenario, if a first sensed signal associated with a first wavelength is within a second quality region while a second sensed signal associated with a second wavelength is within the fourth quality region, only the data associated with second sensed signal in the fourth quality region may be used or data associated with both the first and second sensed signals may be used such that wavelength difference detection and correction and weight average calculations are determined. In a fourth scenario, if a first sensed signal associated with a first wavelength is within the third quality region and a second sensed signal associated with a second wavelength is within the second quality region, only the first sensed signal in the third quality region may be used or both the first and second sensed signals may be used such that wavelength difference detection and correction and weight average calculations are determined. In a fifth scenario, both a first sensed signal associated with a first wavelength and a second sensed signal associated with a second wavelength are within the second quality region, the sensed signal with the larger average magnitude may be used or data associated with both the first sensed signal and the second sensed signal may be used such that wavelength difference detection and correction and weight average calculations are determined. In a sixth scenario, if both the first sensed signal and the second sensed signal are within either of the third quality region or the fourth quality region, the weight average of the data associated with each of the wavelengths is used.

At step 607, a decision is made as to whether to apply jump detection and correction. For detecting phase jumps caused by low SNR versus phase jumps caused by high phase slew, phase jump detection is not needed in the fourth quality region. Using jump detection when a wavelength is within the fourth quality region may provide incorrect results if one of the wavelengths saturates at maximum digitizer range. When sensed signals are within the first quality region, jump detection and correction is not applied. When sensed signals are within the third quality region, jump detection and correction may be applied, but jumps should be less frequent or completely absent if the threshold associated with the third region is optimally set. When sensed signals are within the fourth quality region, jump detection and correction should be applied.

At step 609, jump detection and correction is applied to one or more sensed signals. When a phase jump occurs on one of the wavelengths, the phase of the two wavelengths, for example, will separate and remain separate by $2\pi$ radians, or if already separated or offset, the offset will increase or decrease and remain so by $2\pi$ radians. For example, when a phase jump occurs on one of the sensed signals, the phase of each of the sensed signals will separate and remain separate by $2\pi$ radians. To detect this occurrence, with dPhase as the input, a double integration is performed. Discrete coefficients over the temporal range of the double integration may be predetermined and applied in one multiply and accumulate step to yield a single result. This single result is compared to a detect threshold to make a decision as to whether or not a phase jump occurred. To detect real-world differences in phase that manifest over a range of temporal samples, multiple sized windows should be used concurrently. An information handling system, for example, a data acquisition unit or processor 330 or 430, applies a double integral to the received backscattered or reflected waveform or the sensed signal, for example, electrical outputs 323 and 425. To meet the efficiency needs of real-time processing, one or more discrete coefficients over a temporal range of the double integration may be predetermined and applied in one multiply and accumulate step. The temporal array of coefficients multiplied by an equally sized, temporal range of a dPhase difference data, for example, the dPhase sample produced by analysis of a processed backscattered or reflected waveform such as the one or more electrical outputs 323 or 425, to generate a difference detection window. The difference detection window or dPhase difference data is shifted by one temporal sample in a scanning manner to scan an entire block of data.

Figure 9:
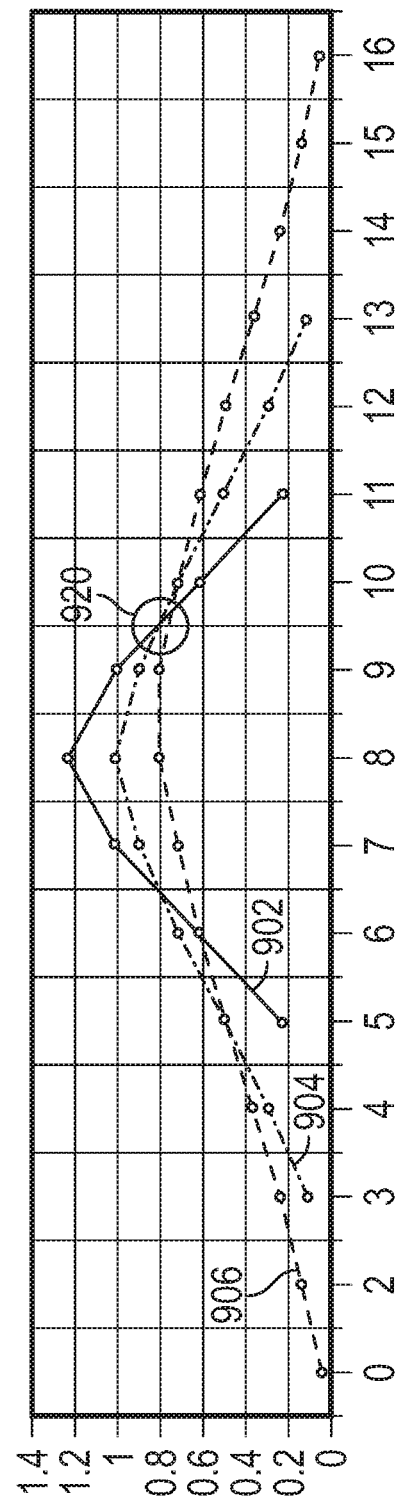
FIG. 9 illustrates difference detection windows, according to one or more aspects of the present disclosure.

To detect real-world differences in phase that manifest over a range of temporal samples, multiple sized difference detection windows should be used independently but in a coordinated manner to scan the dPhase differences. FIG. 9 illustrates different sized difference detection windows, according to one or more aspects of the present disclosure. The three different sized difference detection windows 902, 904 and 906 are scaled versions of a discrete-time, double integration, with all three applicable to a threshold around 4.5 radians of phase displacement. Each difference detection window performs a multiple, accumulate and threshold compare to detect a phase jump. A first difference detection window 902, the narrowest window, best detects where the difference in phase manifests quickly, for example, within two or three temporal samples. The second difference detection window 904, a medium sized window, best detects differences in phase that manifest at or about four to six or seven temporal samples. The third difference detection window 906, the largest window, best detects differences in phase that manifest at or about or greater than seven or more temporal samples. The longer the manifestation, the rarer the occurrence and as such large difference detection window sizes do not provide, generally, efficient phase jump detection given the increased computational power required to determine phase jump detection. The number of windows, length of windows or both may be reduced to provide more efficient use of computational power in exchange for less phase jump detection accuracy.

The difference detection windows 902, 904 and 906 work well with a detect threshold of 4.5 radians of phase displacement when trying to detect, for example, a six radian jump. Generally, the scaling of a difference detection window and the optimal detect threshold are proportionally related.

The scaling of a difference detection window is directly proportional to the optimal detect threshold. The scaling and relative placement of each difference detection window 902, 904 and 906 may create a common crossing point 920. Temporally in front of crossing point 920, thresholds or scaling should be such that even a Zit radian jump that manifests concentrated in one temporal sample should not exceed a threshold and trigger a jump detected. The manifestation of a Zit radian jump will usually have that Zit radians spread over a number of consecutive temporal samples, and when those consecutive culprit samples are at or near the higher coefficient window center and then exceed threshold, a jump is detected. The scaling of the difference detection windows 902, 904 and 906 is such that each uses the same threshold and detection does not occur until the culprit phase differences samples are into the center or crossing point 920 of the different detection windows 902, 904 and 906. A threshold that is set too low results in early detection, leaving many of the culprit phase difference samples too far in front and beyond the range used in the following steps which may result in a false detection of phase jump. Too high of a threshold allows the culprit phase difference samples to go too far past the higher coefficient center of the difference detection windows 902, 904 and may result in failure to detect a phase jump.

A second challenge is to properly locate the temporal range and number of dPhase samples over which the $2\pi$ phase jump occurred and subsequent $2\pi$ phase jump correction should occur. At step 611, locating the range of the $2\pi$ phase jump is determined. For example, an examination of a span of sixteen temporal dPhase difference samples detected a difference detection window that contains a phase jump. For example, a smoothing or averaging filter, as provided in Equation 6, is scanned through sixteen temporal dPhase difference samples from step 610 from i=0 to i=10, results in eleven averaged temporal samples.

average temporal sample=[0.25*dPhase(i)+
0.5*dPhase(i+1)+dPhase(i+2)+dPhase(i+3)+
0.5*dPhase(i+4)+0.25*dPhase(i+5)]/3.5     (Equation 6).

The smoothed dPhase difference temporal samples may be truncated if needed. For example, the eleven dPhase difference sample from i=0 to i=10 are accumulated by first looking for $\pi$ radians or more of accumulated dPhase difference from the accumulated minimum (zero if no dip in accumulated phase initially). Once above the $\pi$ level of accumulated dPhase difference, a $2\pi+\pi/2$ (or higher) of accumulated dPhase difference above minimum accumulated dPhase difference is looked for to detect another jump within the window (of same polarity). Simultaneously, or substantially simultaneously, a fall $\pi/2$ from accumulated dPhase difference maximum is looked for to detect another jump within the window (of opposite polarity). If one of the accumulated dPhase difference excursions occurs (once above the it threshold), then the process stops and the sample with the accumulated dPhase difference excursions is thrown out along with the following or subsequent samples the smoothed dPhase difference temporal samples are truncated. If no dPhase difference excursions occur, then all eleven smoothed samples are retained. Thus, a resulting smoothed dPhase difference temporal samples is obtained that comprises either eleven smoothed dPhase difference samples or some number of truncated smoothed dPhase difference samples.

Next, the range containing large dPhase differences is located. The dPhase mean and the dPhase standard deviation are used to label the resulting smoothed dPhase difference temporal samples as above the dPhase mean or below the dPhase mean. If the dPhase mean is a sufficient multiple of the standard deviation, for example, three to four times higher, the dPhase mean minus the dPhase standard deviation may be used to categorize the resulting smoothed dPhase difference temporal samples. In one or more embodiments, starting at temporal sample i=0, a scan is performed until a sample larger than the dPhase mean or dPhase mean minus dPhase standard deviation is found. The result of this scan is the located start index for smoothed temporal samples. The same scan is also performed in the reverse temporal direction starting with the last temporal sample not truncated until a sample larger than the dPhase mean or dPhase mean minus dPhase standard deviation is found. The result of this reverse scan is the located stop index for smoothed temporal samples. Where each end-towards-middle scan stopped is the located range in terms of the resulting smoothed dPhase difference samples. The above example assumes a positive dPhase difference is detected. For a negative dPhase difference detected, the original sixteen dPhase difference sample are multiple by −1 prior to applying the smoothing or averaging filter, such as, Equation 6.

Continuing, the located range based on the located start and stop index of the eleven smoothed samples is translated back to the original sixteen dPhase difference samples. For example, the next step is to translate the start and stop index done from the resulting smoothed dPhase difference samples back to the original 16 sample dPhase difference by adding three to the smooth sample set start index and subtracting the smoothed sample set stop index from twelve if all eleven samples remain or smoothed set length+1 if otherwise. The result is a reduced range within the original sixteen dPhase difference samples.

At step 613, a resulting start index dPhase difference sample and a resulting stop index dPhase difference sample within the original smoothed dPhase difference sample range are each multiplied by 0.5 to obtain scaled results. Then each of the corresponding samples one before the resulting start index dPhase difference sample and one after the resulting stop index dPhase difference sample are multiplied by 0.25 to obtain scaled results. The middle resulting dPhase differences samples are unscaled. The scaled and unsealed results from one sample before the start index to one sample after the stop index are accumulated and the residual from $2\pi$ is computed for each, by taking the absolute value of $2\pi$ minus the accumulated result and the absolute value of $-2\pi$ minus the accumulated result and selecting the smaller result as the residual for the given range. The residual may be computed using the described processes for additional ranges of (new start index=start index−1, new stop index=stop index), (new start index=start index, new stop index=stop index+1) and (new start index=start index−1, stop index+1) such that four residuals are determined. The lowest of the four residuals is selected as the dPhase$_{residual}$, and the associated range of the lowest of the four residuals is selected as the located range represented by the start index i$_{start}$ and the stop index i$_{stop}$, and this is the exclusive start index i$_{start}$ and the stop index i$_{stop}$ to be used in subsequent steps or processing.

During the narrowing technique, each lowest residual set from each iteration is compared to a residual threshold to determine if the set has a valid residual from ±$2\pi$ (plus or minus $2\pi$) by comparing the residual to a residual threshold. If the absolute value of the lowest residual set is less than or at or about or both the residual threshold, then that lowest residual set (which has a length, for example, a length of thirteen samples, seven samples, etc.) contains a valid $2\pi$ phase jump.

At step 615, the dPhase differences are corrected even though it is not known for any jump which wavelength jumped and without correcting for any jump the wavelength that experienced the phase jump. Performing dPhase difference correction at step 615 prevents detection of the same phase jump as phase jump detection continues. When dPhase differences are corrected, the correction itself must not cause artifacts on the temporal edges of the replace window that may contribute to future false detected phase jumps or missed detected phase jumps. These temporal edges correspond to the first and last temporal samples to be replaced and the un-replaced temporal samples before and after. A gradual technique, as discussed below, where the first and last dPhase difference temporal samples receive a quarter correction (scaled by 0.75), the two after and before the first and last dPhase difference temporal samples receive a half correction (scaled by 0.5), and the remaining middle samples receive a full correction (set to 0.5), and the remaining middle samples receive a full correction (set to 0) accomplishes the goal of avoid producing temporal edge artifacts and suffering the impact of such. The corrections described above do not yet have the average residual added to the corrections, as detailed in the next steps. The selected lowest residual (dPhase$_{residual}$) determined at step 611 is divided by the number of dPhase difference samples to be corrected, where the number of dPhase difference samples to be corrected is $i_{stop}-i_{start}+3$, to obtain the average residual. The average residual is added to the sum of each of the resulting start index dPhase difference sample and the resulting stop index dPhase difference sample multiplied by 0.5, for example, as illustrated in Equations 7 and 8, to obtain a first correction and a second correction.

first correction=0.5*(dPhase difference [$i_{start}$])+average residual　　　(Equation 7).

second correction=0.5*(dPhase difference [$i_{stop}$])+average residual　　　(Equation 8).

Each of the temporal dPhase difference samples one before the start index and the one after the stop index the resulting stop index are multiplied by 0.75, summed and added to the average residual, for example, as illustrated in Equations 9 and 10, to obtain a third correction and a fourth correction.

third correction=0.75*(dPhase difference [$i_{start}-1$])+average residual　　　(Equation 9).

fourth correction=0.75*(dPhase difference [$i_{stop}+1$])+average residual　　　(Equation 10).

Each of the middle temporal dPhase difference samples within the start index and the stop index, but not including the start index and stop index are set to the average residual to obtain a fifth correction. Each of the dPhase difference samples associated with the first correction, the second correction, the third correction, the fourth correction and the fifth correction are replaced by the first correction, the second correction, the third correction, the fourth correction and the fifth correction, respectively.

At step 617, one or more temporal sample sets of six to thirteen consecutive temporal dPhase samples within the block of N temporal dPhase samples is replaced or corrected. To correct the phase jump that occurred on any one of the wavelengths, temporally consecutive samples associated with the non-jumped wavelength are used to replace the corresponding temporally consecutive samples associated with the jumped wavelength. The location and length of the temporal samples replaced is determined at step 611, where the located start index $i_{start}$ and stop index $i_{stop}$ were determined. In one or more embodiments, between six to thirteen consecutive temporal samples are replaced for each jump detected and corrected.

A full replace of two to nine temporally consecutive dPhase samples, a half replace of the two dPhase samples temporally bounding the two to nine full replace samples on each end, and a quarter replace of the two samples temporally bounding the half replace samples on each end may be made. The jump located start index $i_{start}$, and stop index, $i_{stop}$, previously determined correspond to the two half replace dPhase samples, respectively. First, it is determined which of the wavelengths, for example, $\lambda_1$, $\lambda_2$ and $\lambda_N$, jumped as follows:

Step 1) For each wavelength $\lambda$ sum, the temporal range corresponding to the two to nine full replaces (from $i_{start}+1$ to $i_{stop}-1$) with the two half replaces ($i_{start}$ and $i_{stop}$), for example, to yield a first phase displacement (PhaseDisp$_1$) and a second phase displacement (PhaseDisp$_2$) corresponding to $\lambda_1$, $\lambda_2$, respectively.

Step 2) For each wavelength $\lambda$ sum, the temporal samples corresponding to the two to nine full replaces (from $i_{start}+1$ to $i_{stop}-1$), the two half replaces ($i_{start}$ to $i_{stop}$), the two quarter replaces ($i_{start}-1$ to $i_{stop}+1$), the two temporal samples bounding the two quarter replaces ($i_{start}-2$ to $i_{stop}+2$) multiplied by 0.5 and the two temporal samples bounding the two temporal samples bounding the two quarter replaces (at $i_{start}+3$ to $i_{stop}-3$) multiplied by 0.25. Divide the result by the total number of weighted samples used above, the number of full replace samples (($i_{stop}-1$) ($i_{start}+1$)+1) plus the number of half replace samples (2) plus the number of quarter replaces samples (2) plus the weighted number of replace samples that were multiplied by 0.5 (2*0.5) plus the weighted number of replace samples that were multiplied by 0.25 (2*0.25), which equals ($i_{stop}-i_{start}+4.51$), to obtain the first dPhase average (dPhaseAvg1) associated with the first wavelength, for example, $\lambda_1$, and the second dPhase average (dPhaseAvg2) associated with the second wavelength, for example $\lambda_2$.

Step 3) For each wavelength $\lambda$ sum, the two sets of temporal samples before and after the quarter replace locations (at ($i_{start}-2$ and $i_{stop}+2$ and at $i_{start}+3$ to $i_{stop}-3$) using the same 0.5 and 0.25 scaling in step 2 for those four samples along with both quarter replace samples (at $i_{start}-1$ to $i_{stop}+1$) scaled by 0.5. Divide this scaled sum of six samples by the total number of weights samples of this scaled sum of six samples (2.5) to obtain the first edge dPhase average (dPhaseEdgeAvg$_1$) associated with the first wavelength, for example, and the second edge dPhase average (dPhaseEdgeAvg$_2$) associated with the second wavelength, for example, $\lambda_2$.

4) For a positive $2\pi$ difference phase jump,

Variance 1A=(PhaseDisp$_1$−2π−dPhaseAvg$_2$)$^2$　　　(Equation 11)

Variance 1B=(PhaseDisp$_1$−2π−dPhaseEdgeAvg$_1$)$^2$　　　(Equation 12)

Variance 2A=(PhaseDisp$_2$+2π−dPhaseAvg$_1$)$^2$　　　(Equation 13)

Variance 2B=(PhaseDisp$_2$+2π−dPhaseEdgeAvg$_2$)$^2$　　　(Equation 14)

For a negative $2\pi$ difference phase jump, $-2\pi$ is substituted for $2\pi$ in Equations 11-14.

5) A comparison of two probabilities based on the above Equations 11-14 is performed as illustrated in Equations 15 and 16.

$$\text{First Probability} = \frac{1}{\text{Variance } 1A} + \frac{\sqrt{x}}{\text{Variance } 1B} \quad \text{(Equation 15)}$$

$$\text{Second Probability} = \frac{1}{\text{Variance } 2A} + \frac{\sqrt{x}}{\text{Variance } 2B}, \quad \text{(Equation 16)}$$

where $X=6/((i_{stop}-i_{start}+1)+6)$, and where "6" is the number of samples used in the average dPhaseEdgeAvg. The above weights the First Probability and the Second Probability outcomes by the square root of the associated sample size which is consistent with the universally understood relationship between statistical error and sample size, for example, that the statistical error is inversely proportional to the square root of the sample size.

6) The higher probability of the First Probability and the Second Probability is selected as the wavelength that jumped.

In one or more embodiments, for sensing higher frequency signals the edge dPhase average is split into a leading edge average and trailing edge average which results in three variances instead of two variances as illustrated in Equations 11 and 12 and Equations 13 and 14. In one or more embodiments, a at least a four samples average is used for each edge dPhase average to provide a reliable average. A four sample edge dPhase average should scale the edge samples by 0.5, 1, 1 and 0.5 and sum and divided by three. Once the four sample edge dPhase average is obtained then the corresponding variances and probabilities may be determined as discussed above.

In one or more embodiments, the selection of the wavelength that jumped may be influenced by the average magnitude of each wavelength over a process block of data, for example, the mean of $\sqrt{I^2+Q^2}$ over a block), where this average magnitude is used to assess quality of the process discussed with respect to FIG. 6B and to weight dPhase as part of the dPhase weighted average step. In one or more embodiments, a quick selection of the wavelength that jumped may be made by selecting the lower average magnitude wavelengths as the wavelength that jumped. In one or more embodiments, if a programmable threshold ratio of high magnitude divided by low magnitude is exceeded, then the wavelength associated with the low magnitude may be assumed to be the wavelength that jumped. In one or more embodiments, a combination of average magnitude over a process block, magnitude over a single or narrow temporal range, and a probability analysis may be utilized to determine the wavelength that jumped.

To correct the phase jump that occurred on one of the wavelengths, for example, one of wavelengths $\lambda_1$, $\lambda_2$ and $\lambda_N$, a temporally consecutive array of the "non-jumped" data of the wavelength is used to replace the corresponding temporally consecutive array of the "jumped" data of the wavelength. The location and length replaced may be determined, for example, based on steps 610-614 of FIG. 6A. In one or more embodiments, a full replace of two to nine samples, a half replace of the two samples temporally bounding the full replace of the two to nine samples and a quarter replace for the two samples temporally bounding the half replace samples. For the full replace samples (from $i_{start}+1$ to $i_{stop}-1$), the data associated with the jumped wavelength is corrected as (dPhase$_{jumped}$) by making dPhase$_{jumped}$ equal to the data associated with the non-jumped wavelength (dPhase$_{non-jumped}$) plus the average residual determined at step 611\. For the two half replace samples (at $i_{start}$ and $i_{stop}$), the dPhase$_{jumped}$ is corrected by making dPhase$_{jumped}$ equal to (dPhase$_{jumped}$+dPhase$p_{non-jumped}$)/2 plus the average residual determined at step 611. For the two quarter replace samples (at $i_{start}-1$ to $i_{stop}+1$), the dPhase$_{jumped}$ is corrected by making dPhase$_{jumped}$ equal to (3*dPhase$_{jumped}$+dPhase$_{non-jumped}$)/4 plus the average residual determined at step 611, dPhase$_{residual}$.

In one or more embodiments, any one or more steps of FIGS. 6A and 6B may be implemented using any one or more applications, including, but not limited to, Content Rayleigh Interrogator (CRI) Distributed Acoustic Sensing (DAS) (CRI-DAS).

At step 619, a weighted average is determined. The dPhase from each wavelength is weighted or scaled by the associated average magnitude over the process block of data (mean of $\sqrt{I^2+Q^2}$ over the block) and then the two scaled dPhases are averaged into a single dPhase as illustrated in Equation 17.

$$dPhaseWeightedAvg = \frac{(\overline{M}_1 * dPhase1 + \overline{M}_2 * dPhase2)}{\overline{M}_1 + \overline{M}_2}. \quad \text{(Equation 17)}$$

If either $\overline{M}_1$ or $\overline{M}_{12}$ are below a faded threshold, only data from one wavelength is used for the entire block of data (at that spatial location) with detection through weighted average processing steps being skipped. If both $\overline{M}_1$ or $\overline{M}_{12}$ are below a faded threshold, dPhase=0 is output for the entire block of data (at that spatial location).

At step 621, a verify and correction step uses secondary windows at the temporal locations corresponding to the phase jump corrections to verify accuracy of the phase jump correction. The secondary windows are applied to a temporal range of single, weighted average and dPhase samples. The secondary windows are used to allow larger temporal windows to be used, the windows to be applied on a single, post-weighted average dPhase, and windows to be applied across block boundaries. The benefits and resulting effectiveness of these secondary windows stem from being able to be applied across block boundaries. The benefits and resulting effectiveness of these secondary windows stems from the larger temporal range, from the reduced noise of the weighted average dPhase, and from the guaranteed and easily detectable full $2\pi$ of phase jump present in the weighted average dPhase if the wrong wavelength was corrected, for example, at step 617.

Figure 11:
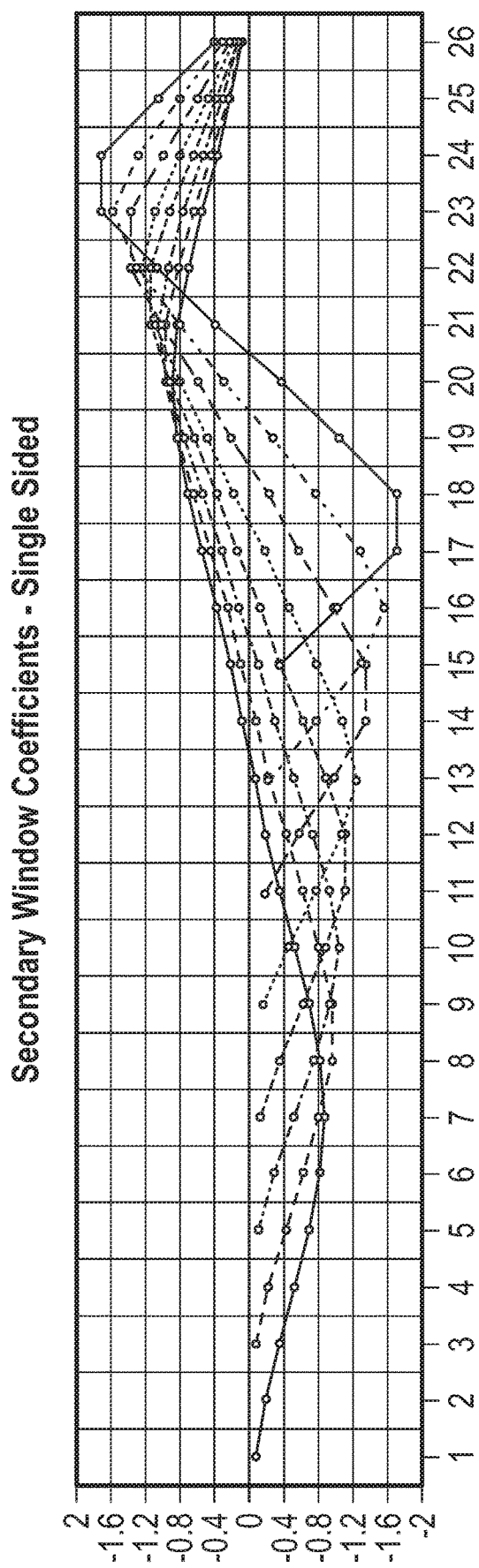
FIG. 11 illustrates single sided difference detection windows, according to one or more aspects of the present invention.

One or more of the key aspects of the secondary windows are the same gradual change in coefficients as the difference detection windows, but the secondary windows have net zero weighting. Having a net zero weighting means when applied to a temporal range of samples with a constant dPhase, the multiple and accumulate sum of these secondary windows will yield a result of zero. As illustrated in FIG. 11 which depicts dual sided secondary windows, the larger the difference in accumulated weighted average dPhase in the positive center lobe compared to the negative left and right lobes, the larger the magnitude the multiple and accumulate result. A big accumulated weighted average dPhase difference relative to the temporal neighbors before and after detected at the location of a correction is indicative of a wrong wavelength selection and corrected.

Figure 10:
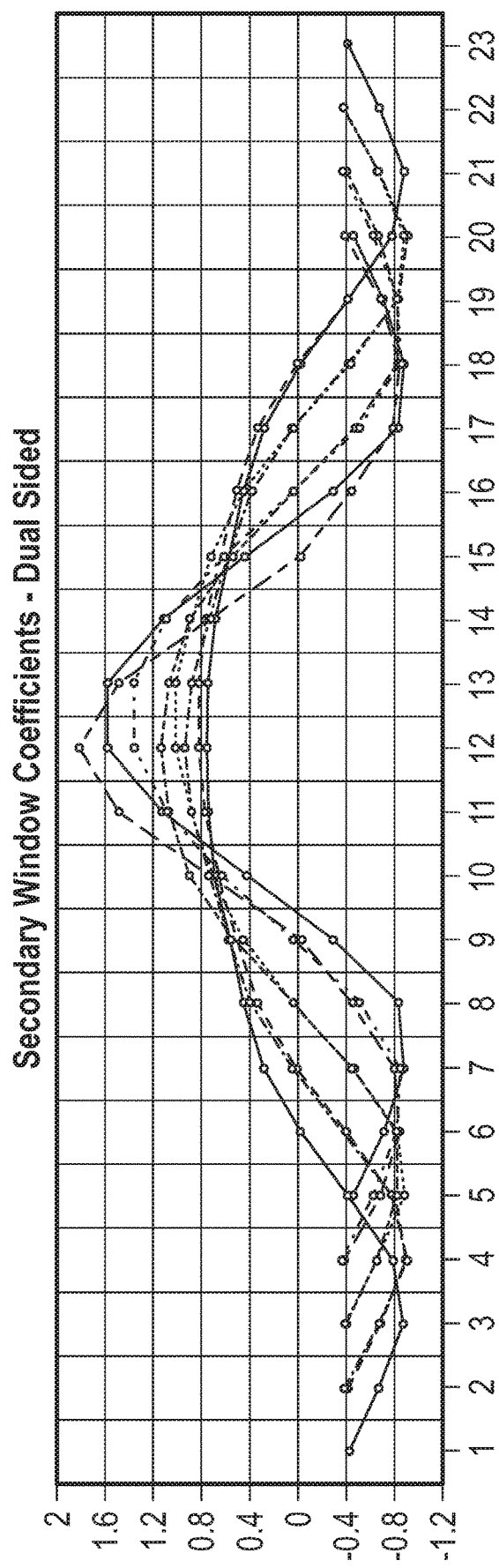
FIG. 10 illustrates dual sided difference detection windows, according to one or more aspects of the present invention.

At step 623, depending on the temporal location and number of samples replaced (from two to nine fully replaced samples) and determined by $i_{stop}-1$ and $i_{start}-1$, the appropriate secondary window is selected and is applied at the appropriate location where the replace range from $i_{start}$ to $i_{stop}$ determined at step 611 is centered in the selected positive lobe of the secondary window as, for example, illustrated in FIG. 10 and in FIG. 11.

The appropriate secondary window for the smallest replace including only two samples fully replaced is the sixteen temporal sample wide dual-sided secondary window of FIG. 10 or the twelve temporal sample wide single sided secondary window of FIG. 11.

The appropriate secondary window for the smallest replace including only two samples fully replaced is the sixteen temporal sample wide dual-sided secondary window of FIG. 10 or the twelve temporal sample wide single sided secondary window of FIG. 11.

The appropriate secondary window for the replace including three samples fully replaced is the seventeen temporal sample wide dual-sided secondary window of FIG. 10 or the fourteen temporal sample wide single-sided secondary window of FIG. 11.

The appropriate secondary window for the replace including four samples fully replaced is the eighteen temporal sample wide duals sided secondary window of FIG. 10 or the sixteen temporal sample wide single sided secondary window of FIG. 11.

The appropriate secondary window for the replace including five samples fully replaced is the nineteen temporal sample wide dual sided secondary window of FIG. 10 or the eighteen temporal sample wide single sided secondary window of FIG. 11.

The appropriate secondary window for the replace including six samples fully replaced is the twenty temporal sample wide dual sided secondary window of FIG. 10 or the twenty temporal sample wide single sided secondary window of FIG. 11.

The appropriate secondary window for the replace including seven samples fully replaced is the twenty-one temporal sample wide dual sided secondary window of FIG. 10 or the twenty-two temporal sample wide singled sided secondary window of FIG. 11.

The appropriate secondary window for the replace including eight samples fully replaced is the twenty-two temporal sample wide dual sided secondary window of FIG. 10 or the twenty-four temporal sample wide single sided secondary window of FIG. 11.

The appropriate secondary window for the replace including nine samples fully replaced is the twenty-three temporal sample wide dual-sided secondary window of FIG. 10 or the twenty-six temporal sample wide single-sided secondary window of FIG. 11.

The multiplication of weighted average dPhase samples by the selected secondary window coefficients, with the positive lobe of the secondary window centered at $(i_{start}+i_{stop})/2$ corresponding to the center of the replace correction being verified, is performed and then these twelve to twenty-six results are summed into a single result and compared to a secondary window threshold associated with the selected secondary window. The same secondary window and mathematical operation is applied twice more to the weighted average dPhase samples just used but shifted by one temporal sample to the left and to the weighted average dPhase samples just used but shifted by one temporal sample to the right in the same multiply and accumulate manner and both results compared to the same threshold as the first result. The coefficients used in FIG. 10 and FIG. 11 for the secondary windows correspond to an optimal threshold from about 4.2 to 4.5 to balance accurate detection with accurate non-detection. Based on the polarity of the dPhase difference that was initially detected and the wavelength selected for the correction, an incorrect selection and correction at step 617 will result in either a $+2\pi$ or a $-2\pi$ jump in the weighted average dPhase being examined with a secondary window, so only a secondary window result exceeding the secondary window threshold and of the correct polarity associated with an incorrect selection and correction at step 617 is used to confirm a wrong previous wavelength selection and correction.

If any of the three multiply and accumulate results exceed the threshold and are of the expected polarity, an incorrect selection and correction is identified to have occurred at step 617.

When an incorrect selection is identified, the temporal samples from $i_{start}-1$ to $i_{stop}+1$ that were replaced receive a shared amount of $+2\pi$ or $-2\pi$ to reverse the effects of the incorrect wavelength selection. The appropriate $+2\pi$ or $-2\pi$ is used and divided by the number of fully replaced temporal samples $((i_{stop}-1)(i_{start}+1)+1)$ plus 1.5 which equals $+2\pi$ or $-2\pi$ divided by $(i_{stop}-i_{start}+0.5)$ and represents one reverse correction unit. The one reverse correction unit is added to the weighted average dPhase temporal samples from $i_{start}+1$ to $i_{stop}-1$ one half of a reverse correction unit is added to the half replaced weighted average dPhase temporal samples at $i_{start}$ and $i_{stop}$ and a quarter a reverse correction unit is added to the quarter replaced temporal samples at $i_{start}-1$ and $i_{start}+1$ to execute a secondary correction. A secondary window scaling may correspond to an optimal threshold of about 4.5 (+4.5 or −4.5 depending on whether an incorrect selected and corrected jump at step 617 would yield $+2\pi$ of phase jump in the weighted average or $-2\pi$ of phase jump in the weighted average.

A second set of single sided secondary windows is shown in FIG. 11. The single-sided secondary window may be used in place of the dual sided secondary windows of FIG. 10. The single sided secondary windows of FIG. 11, for example, have the advantage of only using temporal samples to the left of the phase jump correction being examined, which have already been verified to be free from phase jumps. However, a disadvantage of using the single sided secondary windows is only one negative reference lobe worth of temporal samples for comparison to the positive lobe containing the phase jump range being examined and the negative lobes temporal samples are temporally further away from the positive lobe than with the dual sided secondary windows, for example, of FIG. 10.

In one or more embodiments, any one or more of the steps from FIGS. 6A and 6B are used to provide enhanced visualization for sensed data from a downhole sensor, for example, optical fiber 120. For example, a waterfall plot may be generated based on the enhanced visualization. In one or more embodiments, the enhanced visualization is displayed on a display, for example, display 530 of FIG. 5. For example, a stimulation operation may be altered or adjusted based on the enhanced visualization.

Figure 7:
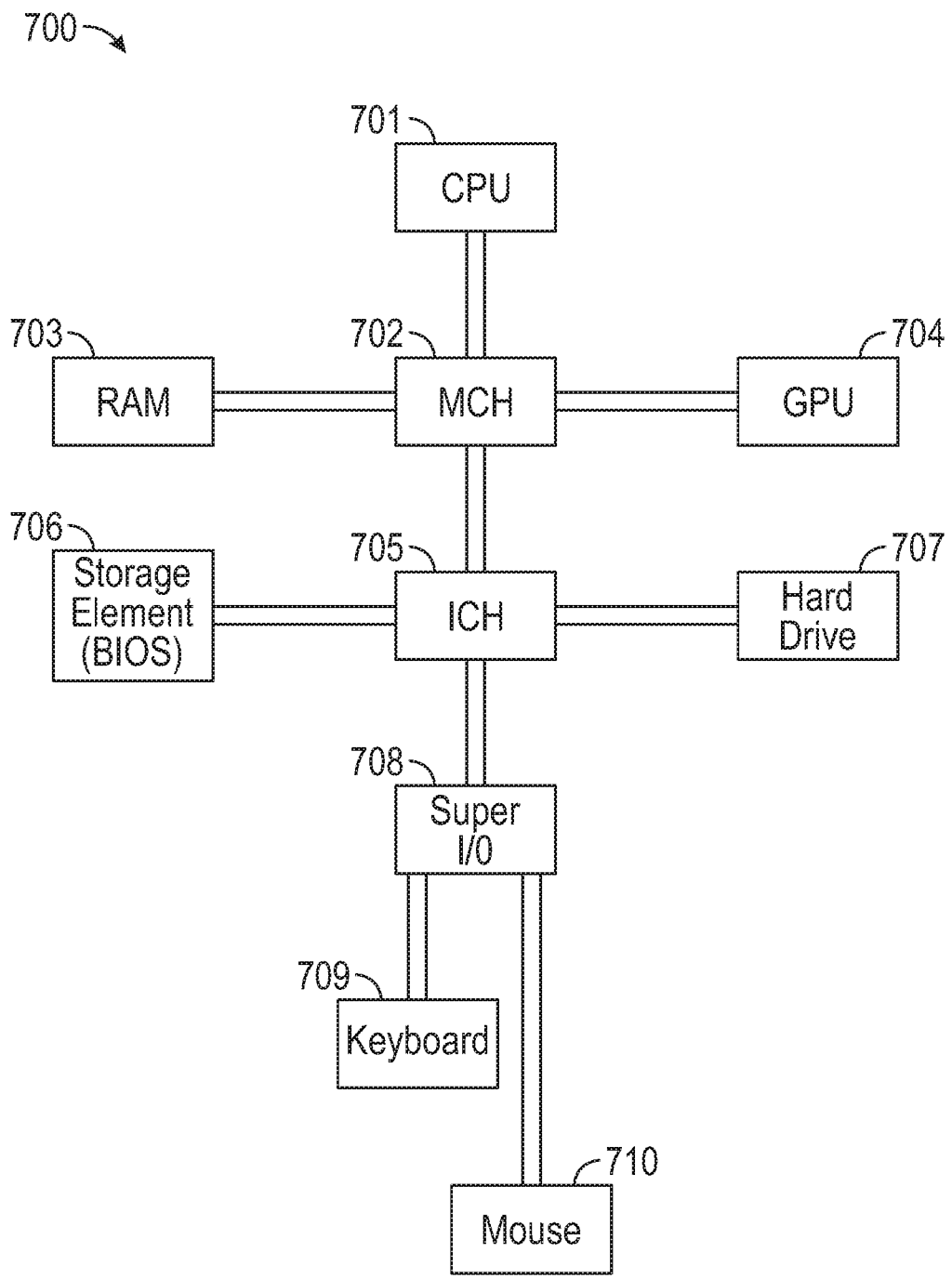
FIG. 7 is a diagram illustrating an information handling system, according to one or more aspects of the present disclosure.

FIG. 7 is a diagram illustrating an example information handling system 700, according to one or more aspects of the present disclosure. The controller 222 may take a form similar to the information handling system 700. A processor or central processing unit (CPU) 701 of the information handling system 700 is communicatively coupled to a memory controller hub (MCH) or north bridge 702. The processor 701 may include, for example a microprocessor, microcontroller, digital signal processor (DSP), application specific integrated circuit (ASIC), or any other digital or analog circuitry configured to interpret and/or execute program instructions and/or process data. Processor 701 may be configured to interpret and/or execute program instructions or other data retrieved and stored in any memory such as memory 703 or hard drive 707. Program instructions or other data may constitute portions of a software or application for carrying out one or more methods described herein. Memory 703 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 403 for execution by processor 701.

Modifications, additions, or omissions may be made to FIG. 7 without departing from the scope of the present disclosure. For example, FIG. 7 shows a particular configuration of components of information handling system 700. However, any suitable configurations of components may be used. For example, components of information handling system 700 may be implemented either as physical or logical components. Furthermore, in some embodiments, functionality associated with components of information handling system 700 may be implemented in special purpose circuits or components. In other embodiments, functionality associated with components of information handling system 700 may be implemented in configurable general purpose circuit or components. For example, components of information handling system 700 may be implemented by configured computer program instructions.

Memory controller hub 702 may include a memory controller for directing information to or from various system memory components within the information handling system 700, such as memory 703, storage element 706, and hard drive 707. The memory controller hub 702 may be coupled to memory 703 and a graphics processing unit (GPU) 704. Memory controller hub 702 may also be coupled to an I/O controller hub (ICH) or south bridge 705. I/O controller hub 705 is coupled to storage elements of the information handling system 700, including a storage element 706, which may comprise a flash ROM that includes a basic input/output system (BIOS) of the computer system. I/O controller hub 705 is also coupled to the hard drive 707 of the information handling system 700. I/O controller hub 705 may also be coupled to an I/O chip or interface, for example, a Super I/O chip 708, which is itself coupled to several of the I/O ports of the computer system, including display 712, keyboard 709 and mouse 710.

In one or more embodiments, a method for correcting a phase sensing error comprises receiving at a sensor an optical signal, wherein the optical signal carries at least a first wavelength and a second wavelength, receiving at a receiving system a reflected waveform from the sensor, generating a plurality of first quadrature pairs associated with the first wavelength for a plurality of temporal samples of the reflected waveform associated with a location, determining a first delta phase for each of the plurality of temporal samples of the reflected waveform for the location based, at least in part, on a first quadrature pair of the plurality of first quadrature pairs associated with a first temporal sample of the plurality of temporal samples and a second quadrature pair of the plurality of first quadrature pairs associated with a second temporal sample of the plurality of temporal samples, generating a second plurality of quadrature pairs associated with the second wavelength of the plurality of temporal samples of the reflected waveform for the location, determining a second delta phase for each of the plurality of temporal samples of the reflected waveform for the location based, at least in part, on a first quadrature pair of the plurality of second quadrature pairs associated with the first temporal sample of the plurality of temporal samples and a second quadrature pair of the plurality of second quadrature pairs associated with the second temporal sample of the plurality of temporal samples, determining a delta phase difference for each of the plurality of temporal samples of the reflected waveform for the location based, at least in part, on the first delta phase and the second delta phase, determining a phase jump of at least one of the first wavelength and the second wavelength based, at least in part, on the delta phase difference, determining a first average magnitude for each of the plurality of temporal samples associated with the first wavelength, determining a second average magnitude for each of the plurality of temporal samples associated with the second wavelength, and determining a corrected phase measurement for the location based, at least in part, on the delta phase difference, the first delta phase, the second delta phase, the first average magnitude and the second average magnitude. In one or more embodiments, the method further comprises transmitting the optical signal from a circulator to the sensor. In one or more embodiments, the method further comprises altering a downhole operation based, at least in part, on the corrected phase measurement. In one or more embodiments, determining the phase jump comprises using a plurality of difference detection windows. In one or more embodiments, the method further comprises determining if at least one of the first quadrature pair and the second quadrature pair are within a quality region. In one or more embodiments, phase jump correction is applied when the at least one of the first quadrature pair and the second quadrature pair are within the quality region. In one or more embodiments, the corrected phase measurement is a $2\pi$ phase jump error.

In one or more embodiments a sensing system comprises a sensor, wherein the sensor receives an optical signal, a receiving system, wherein the receiving system receives a reflected waveform from the sensor, a sensing system, wherein the sensing system generates a plurality of first quadrature pairs associated with the first wavelength for a plurality of temporal samples of the reflected waveform associated with a location, and wherein the sensing system generates a second plurality of quadrature pairs associated with the second wavelength for the plurality of temporal samples of the reflected waveform for the location and a data acquisition unit, wherein the data acquisition unit comprises a processor, wherein the processor executes one or more instructions to determine a first delta phase for each of the plurality of temporal samples of the reflected waveform for the location based, at least in part, on a first quadrature pair of the plurality of first quadrature pairs associated with a first temporal sample of the plurality of temporal samples and a second quadrature pair of the plurality of first quadrature pairs associated with a second temporal sample of the plurality of temporal samples, determine a second delta phase for each of the plurality of temporal samples of the reflected waveform for the location based, at least in part, on a first quadrature pair of the plurality of second quadrature pairs associated with the first temporal sample of the plurality of temporal samples and a second quadrature pair of the plurality of second quadrature pairs associated with the second temporal sample of the plurality of temporal samples, determine a delta phase difference for each of the plurality of temporal samples of the reflected waveform for the location based, at least in part, on the first delta phase and the second delta phase, determine a phase jump of at least one of the first wavelength and the second wavelength based, at least in part, on the delta phase difference, determine a first average magnitude for each of the plurality of temporal samples associated with the first wavelength, determine a second average magnitude for each of the plurality of temporal samples associated with the second wavelength and determine a corrected phase measurement for the location based, at least in part, on the delta phase difference, the first delta phase, the second delta phase, the first average magnitude and the second average magnitude. In one or more embodiments, the system further comprises a circulator, wherein the circulator transmits the optical signal to the sensor. In one or more embodiments, the one or more instructions are further executed by the processor of the data acquisition unit to alter a downhole operation based, at least in part, on the corrected phase measurement. In one or more embodiments, determining the phase jump comprises using a plurality of difference detection windows. In one or more embodiments, the one or more instructions are further executed by the processor of the data acquisition unit to determine if at least one of the first quadrature pair and the second quadrature pair are within a quality region. In one or more embodiments, phase jump correction is applied when the at least one of the first quadrature pair and the second quadrature pair are within the quality region. In one or more embodiments, the corrected phase measurement is a $2\pi$ phase jump error.

In one or more embodiments, a non-transitory computer-readable medium storing one or more instructions that, when executed by a processor, cause the processor to determine a first delta phase for each of a plurality of temporal samples of a reflected waveform for a location based, at least in part, on a first quadrature pair of a plurality of first quadrature pairs associated with a first temporal sample of the plurality of temporal samples and a second quadrature pair of the plurality of first quadrature pairs associated with a second temporal sample of the plurality of temporal samples, wherein the reflected waveform is received from a sensor that reflects an optical signal, determine a second delta phase for each of the plurality of temporal samples of the reflected waveform for the location based, at least in part, on a first quadrature pair of a plurality of second quadrature pairs associated with the first temporal sample of the plurality of temporal samples and a second quadrature pair of the plurality of second quadrature pairs associated with the second temporal sample of the plurality of temporal samples, determine a delta phase difference for each of the plurality of temporal samples of the reflected waveform for the location based, at least in part, on the first delta phase and the second delta phase, determine a phase jump of at least one of the first wavelength and the second wavelength based, at least in part, on the delta phase difference, determine a first average magnitude for each of the plurality of temporal samples associated with the first wavelength, determine a second average magnitude for each of the plurality of temporal samples associated with the second wavelength and determine a corrected phase measurement for the location based, at least in part, on the delta phase difference the first delta phase, the second delta phase, the first average magnitude and the second average magnitude. In one or more embodiments, the one or more instructions when executed by the processor further cause the processor to determine the phase jump comprises using a plurality of difference detection windows. In one or more embodiments, the one or more instructions when executed by the processor further cause the processor to determine if at least one of the first quadrature pair and the second quadrature pair are within a quality region. In one or more embodiments, phase jump correction is applied when the at least one of the first quadrature pair and the second quadrature pair are within the quality region. In one or more embodiments, the corrected phase measurement is a $2\pi$ phase jump error. In one or more embodiments, the one or more instructions when executed by the processor further cause the processor to replace at least one of the first temporal sample and the second temporal sample.

As would be appreciated by those of ordinary skill in the art, with the benefit of this disclosure, the methods of the present disclosure may be implemented on virtually any type of information handling system regardless of the platform being used. Moreover, one or more elements of the information handling system may be located at a remote location and connected to the other elements over a network. In a further embodiment, the information handling system may be implemented on a distributed system having a plurality of nodes. Such distributed computing systems are well known to those of ordinary skill in the art and will therefore not be discussed in detail herein.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

A number of examples have been described. Nevertheless, it will be understood that various modifications can be made. Accordingly, other implementations are within the scope of the following claims.

What is claimed is:

1. A method for correcting a phase sensing error, comprising:
receiving at a sensor an optical signal, wherein the optical signal carries at least a first wavelength and a second wavelength;
receiving at a receiving system a reflected waveform from the sensor;
generating a plurality of first quadrature pairs associated with the first wavelength for a plurality of temporal samples of the reflected waveform associated with a location;
determining a first delta phase for each of the plurality of temporal samples of the reflected waveform for the location based, at least in part, on a difference between a first quadrature pair of the plurality of first quadrature pairs associated with a first temporal sample of the plurality of temporal samples and a second quadrature pair of the plurality of first quadrature pairs associated with a second temporal sample of the plurality of temporal samples;
generating a second plurality of quadrature pairs associated with the second wavelength of the plurality of temporal samples of the reflected waveform for the location;
determining a second delta phase for each of the plurality of temporal samples of the reflected waveform for the location based, at least in part, on a difference between a first quadrature pair of the plurality of second quadrature pairs associated with the first temporal sample of the plurality of temporal samples and a second quadrature pair of the plurality of second quadrature pairs associated with the second temporal sample of the plurality of temporal samples;
determining a delta phase difference for each of the plurality of temporal samples of the reflected waveform for the location based, at least in part, on a difference between the first delta phase and the second delta phase;

determining a phase jump of at least one of the first wavelength and the second wavelength based, at least in part, on the delta phase difference;

determining a first average magnitude for each of the plurality of temporal samples associated with the first wavelength;

determining a second average magnitude for each of the plurality of temporal samples associated with the second wavelength;

determining a corrected phase measurement for the location based, at least in part, on the delta phase difference, the first delta phase, the second delta phase, the first average magnitude and the second average magnitude; and determining that at least one of the first quadrature pair and the second quadrature pair are within a quality region, wherein the quality region extends from at and above a threshold that is at least four times a root mean square (RMS) noise of the sensor; and applying the corrected phase measurement to the at least one of the first quadrature pair and the second quadrature pair that are within the quality region.

2. The method of claim 1, further comprising transmitting the optical signal from a circulator to the sensor.

3. The method of claim 1, wherein determining the phase jump comprises using a plurality of difference detection windows.

4. The method of claim 1, wherein the corrected phase measurement is a $2\pi$ phase jump error.

5. The method of claim 1 further comprising altering a downhole operation based, at least in part, on the corrected phase measurement.

6. A sensing system, comprising:
a sensor, wherein the sensor receives an optical signal;
a receiving system, wherein the receiving system receives a reflected waveform from the sensor;
a sensing system, wherein the sensing system generates a plurality of first quadrature pairs associated with a first wavelength for a plurality of temporal samples of the reflected waveform associated with a location, and wherein the sensing system generates a second plurality of quadrature pairs associated with a second wavelength for the plurality of temporal samples of the reflected waveform for the location; and
a data acquisition unit, wherein the data acquisition unit comprises a processor, wherein the processor executes one or more instructions to:
  determine a first delta phase for each of the plurality of temporal samples of the reflected waveform for the location based, at least in part, on a difference between a first quadrature pair of the plurality of first quadrature pairs associated with a first temporal sample of the plurality of temporal samples and a second quadrature pair of the plurality of first quadrature pairs associated with a second temporal sample of the plurality of temporal samples;
  determine a second delta phase for each of the plurality of temporal samples of the reflected waveform for the location based, at least in part, on a difference between a first quadrature pair of the plurality of second quadrature pairs associated with the first temporal sample of the plurality of temporal samples and a second quadrature pair of the plurality of second quadrature pairs associated with the second temporal sample of the plurality of temporal samples;
  determine a delta phase difference for each of the plurality of temporal samples of the reflected waveform for the location based, at least in part, on a difference between the first delta phase and the second delta phase;
  determine a phase jump of at least one of the first wavelength and the second wavelength based, at least in part, on the delta phase difference;
  determine a first average magnitude for each of the plurality of temporal samples associated with the first wavelength;
  determine a second average magnitude for each of the plurality of temporal samples associated with the second wavelength; and
  determine a corrected phase measurement for the location based, at least in part, on the delta phase difference, the first delta phase, the second delta phase, the first average magnitude and the second average magnitude.

7. The sensing system of claim 6, wherein the one or more instructions are further executed by the processor of the data acquisition unit to determine if at least one of the first quadrature pair and the second quadrature pair are within a quality region, wherein the quality region extends from at and above a threshold that is at least four times a root mean square (RMS) noise of the sensor.

8. The sensing system of claim 7, wherein the corrected phase measurement is applied when the at least one of the first quadrature pair and the second quadrature pair are within the quality region.

9. The sensing system of claim 6, further comprising a circulator, wherein the circulator transmits the optical signal to the sensor.

10. The sensing system of claim 6, wherein the one or more instructions are further executed by the processor of the data acquisition unit to alter a downhole operation based, at least in part, on the corrected phase measurement.

11. The sensing system of claim 6, wherein determining the phase jump comprises using a plurality of difference detection windows.

12. The sensing system of claim 6, wherein the corrected phase measurement is a $2\pi$ phase jump error.

13. A non-transitory computer-readable medium storing one or more instructions that, when executed by a processor, cause the processor to:
  determine a first delta phase for each of a plurality of temporal samples of a reflected waveform for a location based, at least in part, on a difference between a first quadrature pair of a plurality of first quadrature pairs associated with a first temporal sample of the plurality of temporal samples and a second quadrature pair of the plurality of first quadrature pairs associated with a second temporal sample of the plurality of temporal samples, wherein the reflected waveform is received from a sensor that reflects an optical signal;
  determine a second delta phase for each of the plurality of temporal samples of the reflected waveform for the location based, at least in part, on a difference between a first quadrature pair of a plurality of second quadrature pairs associated with the first temporal sample of the plurality of temporal samples and a second quadrature pair of the plurality of second quadrature pairs associated with the second temporal sample of the plurality of temporal samples;

determine a delta phase difference for each of the plurality of temporal samples of the reflected waveform for the location based, at least in part, on a difference between the first delta phase and the second delta phase;

determine a phase jump of at least one of a first wavelength and a second wavelength based, at least in part, on the delta phase difference;

determine a first average magnitude for each of the plurality of temporal samples associated with the first wavelength;

determine a second average magnitude for each of the plurality of temporal samples associated with the second wavelength; and determine a corrected phase measurement for the location based, at least in part, on the delta phase difference the first delta phase, the second delta phase, the first average magnitude and the second average magnitude.

14. The non-transitory computer-readable medium of claim 13, wherein the one or more instructions when executed by the processor further cause the processor to replace at least one of the first temporal sample and the second temporal sample.

15. The non-transitory computer-readable medium of claim 13, wherein the one or more instructions when executed by the processor further cause the processor to determine if at least one of the first quadrature pair and the second quadrature pair are within a quality region, wherein the quality region extends from at and above a threshold that is at least four times a root mean square (RMS) noise of the sensor.

16. The non-transitory computer-readable medium of claim 13, wherein the one or more instructions when executed by the processor further cause the processor to determine the phase jump comprises using a plurality of difference detection windows.

17. The non-transitory computer-readable medium of claim 15, wherein the corrected phase measurement is applied when the at least one of the first quadrature pair and the second quadrature pair are within the quality region.

18. The non-transitory computer-readable medium of claim 15, wherein the corrected phase measurement is a $2\pi$ phase jump error.

* * * * *